United States Patent
Hasegawa et al.

(10) Patent No.: US 7,535,901 B2
(45) Date of Patent: *May 19, 2009

(54) DATA TRANSFER CONTROL DEVICE AND ELECTRONIC INSTRUMENT

(75) Inventors: Tomonaga Hasegawa, Sapporo (JP); Hiroyasu Honda, Chiro (JP)

(73) Assignee: Seiko Epson Corporation, Tokyo (JP)

( * ) Notice: Subject to any disclaimer, the term of this patent is extended or adjusted under 35 U.S.C. 154(b) by 650 days.

This patent is subject to a terminal disclaimer.

(21) Appl. No.: 11/036,048

(22) Filed: Jan. 18, 2005

(65) Prior Publication Data

US 2005/0180417 A1 Aug. 18, 2005

(30) Foreign Application Priority Data

Jan. 22, 2004 (JP) ............................. 2004-014411

(51) Int. Cl.
*H04L 12/28* (2006.01)
(52) U.S. Cl. ................ 370/389; 370/252; 370/536; 700/100
(58) Field of Classification Search ............ None
See application file for complete search history.

(56) References Cited

U.S. PATENT DOCUMENTS 6,845,313 B2   1/2005  Hasegawa et al.
7,203,726 B2 *  4/2007  Hasegawa ............... 709/206

FOREIGN PATENT DOCUMENTS

JP   A 5-204848    8/1993
JP   A 9-083536    3/1997
JP   A 2000-134242  5/2000

* cited by examiner

*Primary Examiner*—Duc C Ho
(74) *Attorney, Agent, or Firm*—Oliff & Berridge, PLC

(57) ABSTRACT

A data transfer control device includes a transceiver which receives a request packet from a partner device connected through the serial bus, and a link controller which analyzes the received request packet. The link controller reads an address size value set in the address size field of the received request packet, omits reading of an address from the address field when the address size value set in the address size field is zero, and reads an address, size of which is indicated by the set address size value from the address field when the address size value set in the address size field is other than zero.

20 Claims, 14 Drawing Sheets

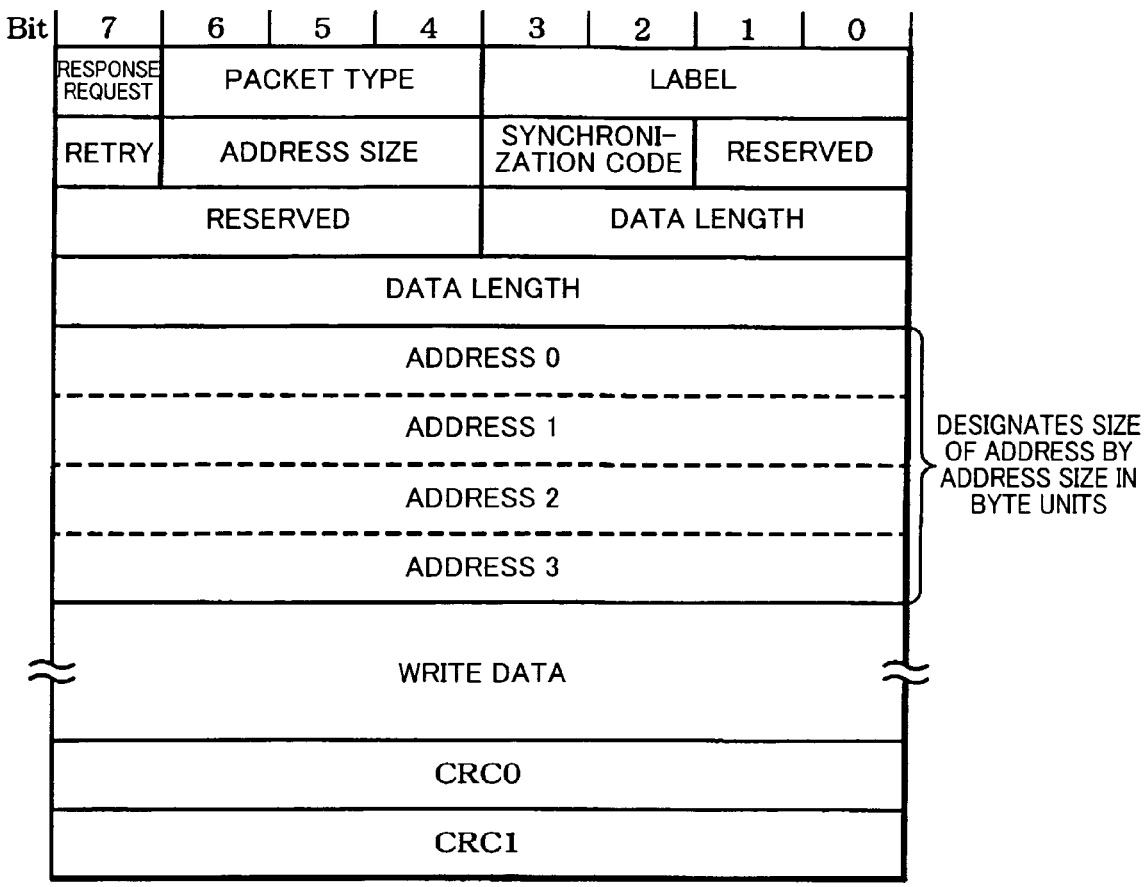
FIG. 2A WRITE REQUEST PACKET
FIG. 2B ACKNOWLEDGE PACKET

FIG. 3A READ REQUEST PACKET
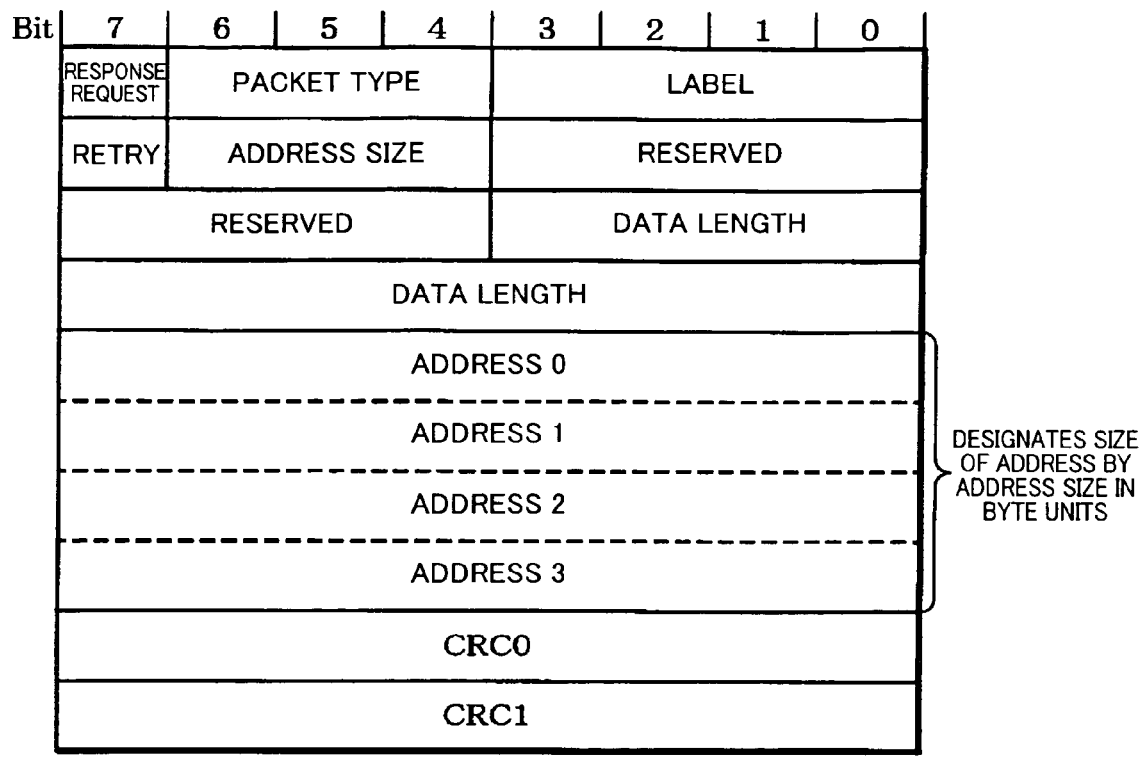
FIG. 3B RESPONSE PACKET
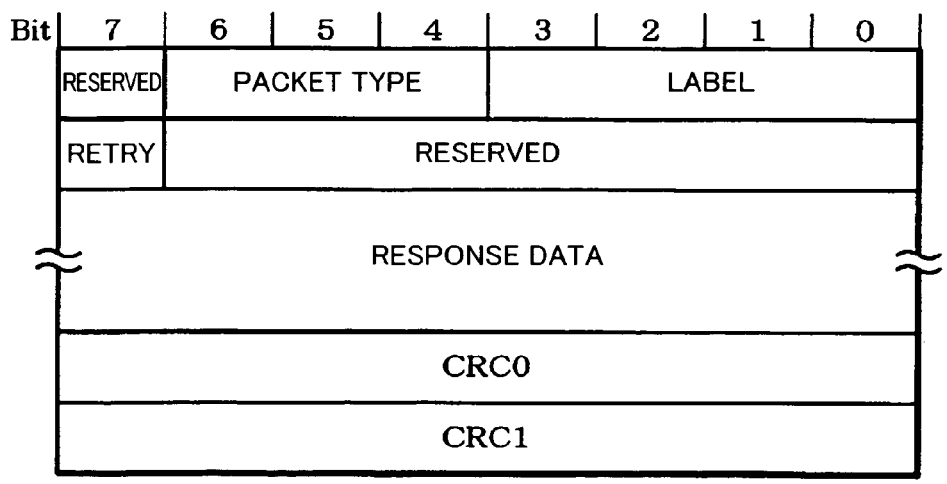

FIG. 4A

| RESPONSE REQUEST VALUE | MEANING |
|---|---|
| 0 | ACKNOWLEDGE PACKET IS UNNECESSARY |
| 1 | ACKNOWLEDGE PACKET IS NECESSARY |

FIG. 4B

| PACKET TYPE VALUE | MEANING |
|---|---|
| 0 | WRITE REQUEST PACKET |
| 1 | RESERVED |
| 2 | READ REQUEST PACKET |
| 3 | RESERVED |
| 4 | RESPONSE PACKET |
| 5 | RESERVED |
| 6 | RESERVED |
| 7 | ACKNOWLEDGE PACKET |

FIG. 4C

| ADDRESS SIZE VALUE | MEANING |
|---|---|
| 0 | NO ADDRESS FIELD |
| 1 | 1-BYTE ADDRESS FIELD |
| 2 | 2-BYTE ADDRESS FIELD |
| 3 | 3-BYTE ADDRESS FIELD |
| 4 | 4-BYTE ADDRESS FIELD |
| 5 | RESERVED |
| 6 | RESERVED |
| 7 | RESERVED |

FIG. 4D

| SYNCHRONIZATION CODE VALUE | MEANING |
|---|---|
| 0 | Sync IS NOT INCLUDED |
| 1 | Vsync IS INCLUDED |
| 2 | Hsync IS INCLUDED |
| 3 | Vsync AND Hsync ARE INCLUDED |

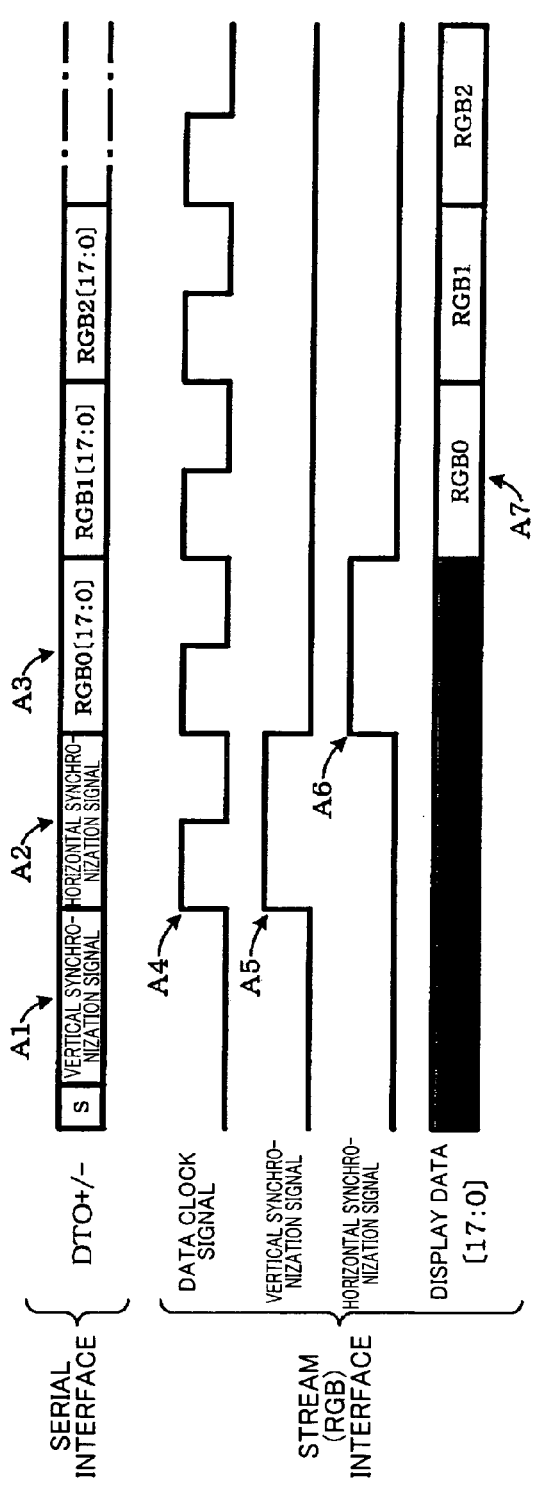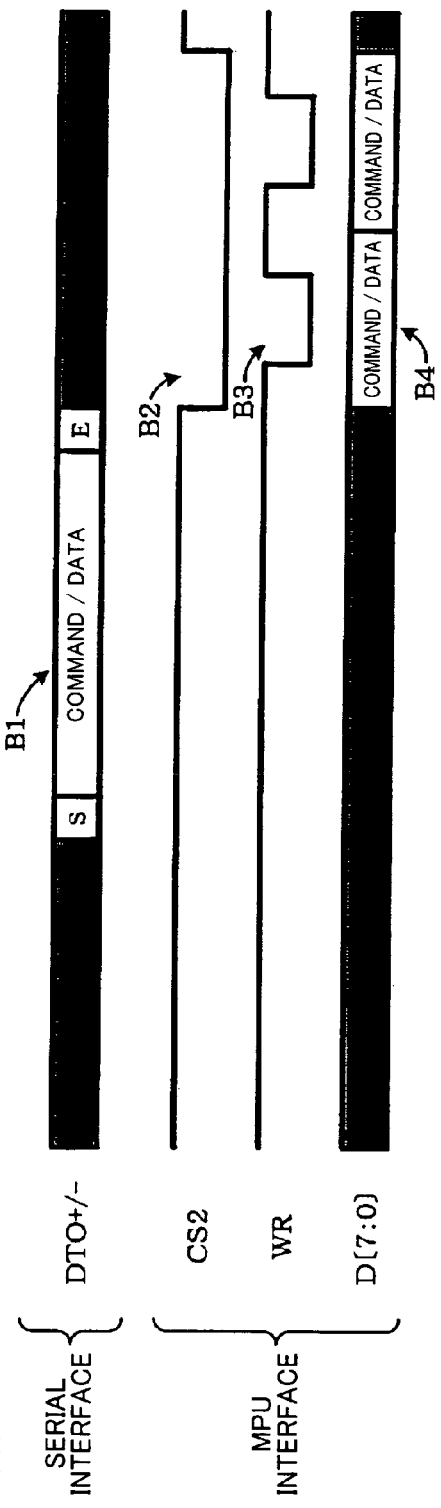

DATA TRANSFER CONTROL DEVICE AND ELECTRONIC INSTRUMENT

Japanese Patent Application No. 2004-14411, filed on Jan. 22, 2004, is hereby incorporated by reference in its entirety.

BACKGROUND OF THE INVENTION

The present invention relates to a data transfer control device and an electronic instrument.

In recent years, a high-speed serial transfer interface such as low voltage differential signaling (LVDS) has attracted attention as an interface aiming at reducing EMI noise or the like. In the high-speed serial transfer, data transfer is realized by causing a transmitter circuit to transmit serialized data using differential signals and a receiver circuit to differentially amplify the differential signals. Digital Visual Interface (DVI) or the like has been known as an interface for such a high-speed serial transfer.

It is preferable that the scale of a data transfer control device which realizes such a high-speed serial transfer be small. In order to increase the data transfer efficiency by dealing with various situations, it is preferable that the number of types of packets to be serially transferred be large.

However, if the number of types of packets to be serially transferred is increased, complicated processing for handling a large number of packets is necessary. This makes it necessary to provide a processor such as a micro processor unit (MPU) in the data transfer control device, whereby the scale of the data transfer control device is increased.

BRIEF SUMMARY OF THE INVENTION

A first aspect of the present invention relates to a data transfer control device for performing serial transfer through a serial bus, the data transfer control device including:

a transceiver which receives a request packet from a partner device connected with the serial bus; and a link controller which analyzes the received request packet, wherein the received request packet includes an address size field for informing a size of an address set in an address field of the request packet, and wherein the link controller reads an address size value set in the address size field of the received request packet, omits reading of an address from the address field when the address size value set in the address size field is zero, and reads an address of which size is indicated by the set address size value from the address field when the address size value set in the address size field is other than zero.

A second aspect of the present invention relates to a data transfer control device for performing serial transfer through a serial bus, the data transfer control device including:

a link controller which generates a request packet to be transmitted to a partner device connected with the serial bus, and directs transmission of the generated request packet; and a transceiver which transmits the request packet of which transmission has been directed to the partner device through the serial bus, wherein the request packet includes an address size field for informing a size of an address set in an address field of the request packet, and wherein, when transmitting a request packet which does not require an address to the partner device, the link controller generates a request packet in which an address size value of zero is set in the address size field and the address field is omitted, and directs transmission of the generated request packet, and, when transmitting a request packet which requires an address to the partner device, the link controller generates a request packet in which an address size value other than zero is set in the address size field and an address of which size is indicated by the address size value is set in the address field, and directs transmission of the generated request packet.

A third aspect of the present invention relates to an electronic instrument including:

any one of the above data transfer control devices; and at least one of a communication device, a processor, an imaging device, and a display device.

BRIEF DESCRIPTION OF THE SEVERAL VIEWS OF THE DRAWING

FIGS. 2A and 2B are format examples of packets.

FIGS. 3A and 3B are format examples of packets.

FIGS. 4A to 4D are illustrative of each field of a packet.

FIGS. 11A and 11B are timing waveform diagrams illustrative of an operation of an interface circuit.

DETAILED DESCRIPTION OF THE EMBODIMENT

Figure 1:
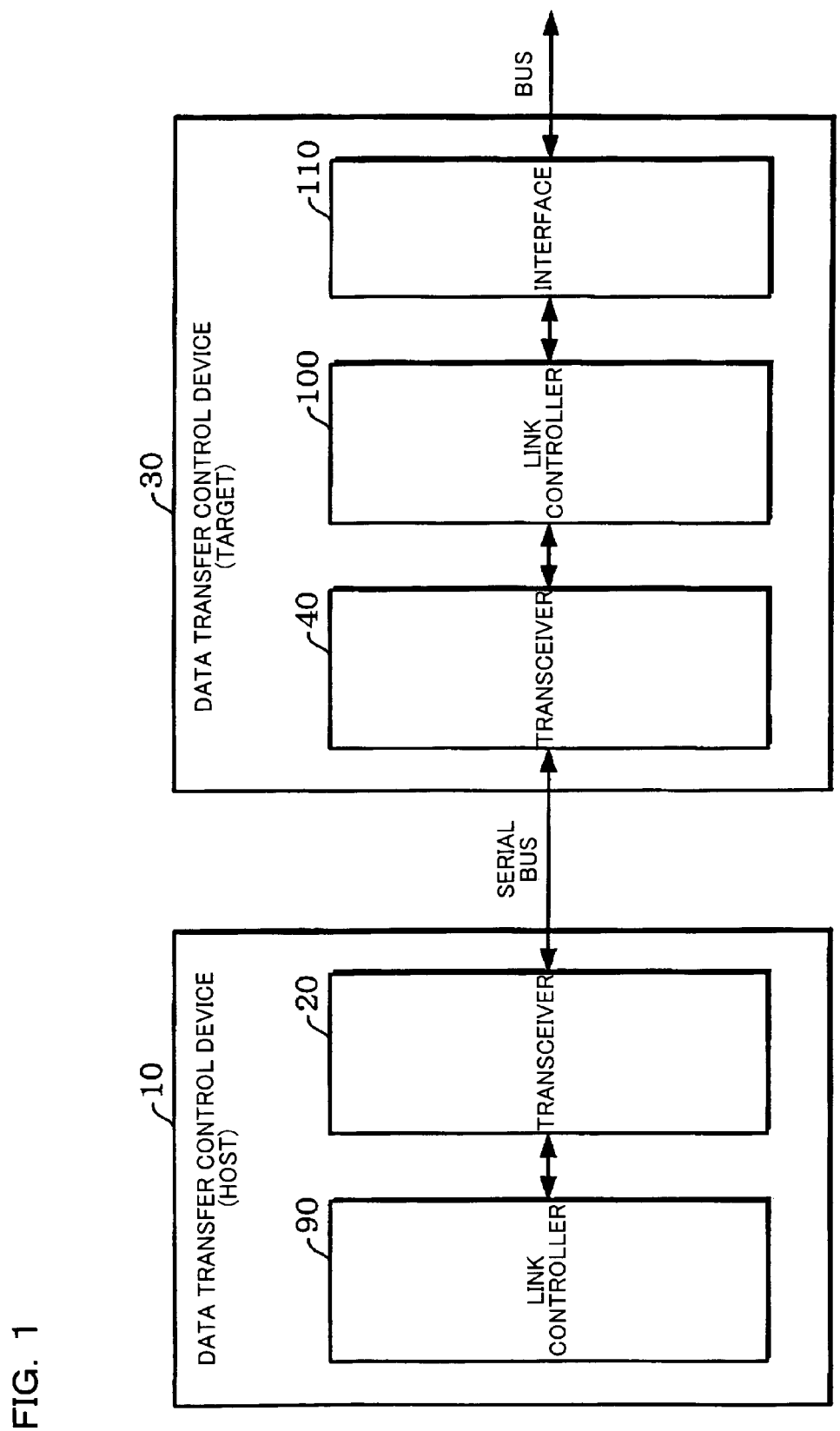
FIG. 1 is a configuration example of a data transfer control device in an embodiment of the present invention.

The present invention has been achieved in view of the above-described technical problem, and may provide a data transfer control device which realizes efficient data transfer using a small number of types of packets, and an electronic instrument including the same.

An embodiment of the present invention provides a data transfer control device for performing serial transfer through a serial bus, the data transfer control device including:

a transceiver which receives a request packet from a partner device connected with the serial bus; and a link controller which analyzes the received request packet, wherein the received request packet includes an address size field for informing a size of an address set in an address field of the request packet, and wherein the link controller reads an address size value set in the address size field of the received request packet, omits reading of an address from the address field when the address size value set in the address size field is zero, and reads an address of which size is indicated by the set address size value from the address field when the address size value set in the address size field is other than zero.

According to this embodiment, the request packet includes the address size field. When an address size value set in the address size field is zero, reading of an address from the address field of the received request packet is omitted. When an address size value set in the address size field is other than zero, an address, size of which is indicated by the set address size value is read from the address field. This enables the request packet having the same field configuration to be used as different types of packets merely by changing the setting of the address size value in the address size field. Therefore, efficient data transfer can be realized using a small number of types of packets.

This data transfer control device may include an interface circuit for performing data transfer through a bus differing from the serial bus, and when the address size value set in the address size field is zero, the link controller may access a first device through the interface circuit and may perform stream transfer of data.

With this data transfer control device, the first device may be a display device, and the data subjected to the stream transfer may be display data.

With this data transfer control device, when the address size value set in the address size field is other than zero, the link controller may read an address, size of which is indicated by the set address size value from the address field and may determine an access destination corresponding to the read address.

This enables the request packet having the same field configuration to be used as a stream transfer packet or a packet which allows addressing of the access destination, whereby efficient data transfer can be realized using a small number of types of packets.

With this data transfer control device, when the determined access destination is a second device, the link controller may access the second device through the interface circuit and may transfer data or a command.

With this data transfer control device, when the determined access destination is an internal register of the data transfer control device, the link controller may access the internal register.

This data transfer control device may include:

a first interface circuit for performing stream data transfer with a first device through a bus differing from the serial bus;

a second interface circuit for performing transfer of command or data with a second device through a bus differing from the serial bus; and a demultiplexer provided between the link controller and the first and second interface circuits, and when an address size value of zero is set in the address size field, the demultiplexer may connect the link controller with the first interface circuit.

This enables stream data transfer to be performed with the first device through the first interface circuit when an address size value of zero is set in the address size field.

With this data transfer control device, when an address size value other than zero is set in the address size field and an access destination corresponding to an address set in the address field is the second device, the demultiplexer may connect the link controller with the second interface circuit.

This enables switching between stream data transfer with the first device and command or data transfer with the second device depending on the setting of the address size value.

Another embodiment of the present invention provides a data transfer control device for performing serial transfer through a serial bus, the data transfer control device including:

a link controller which generates a request packet to be transmitted to a partner device connected with the serial bus, and directs transmission of the generated request packet; and a transceiver which transmits the request packet of which transmission has been directed to the partner device through the serial bus, wherein the request packet includes an address size field for informing a size of an address set in an address field of the request packet, and wherein, when transmitting a request packet which does not require an address to the partner device, the link controller generates a request packet in which an address size value of zero is set in the address size field and the address field is omitted, and directs transmission of the generated request packet, and, when transmitting a request packet which requires an address to the partner device, the link controller generates a request packet in which an address size value other than zero is set in the address size field and an address of which size is indicated by the address size value is set in the address field, and directs transmission of the generated request packet.

According to this embodiment, the request packet includes the address size field. When an address is unnecessary for the request packet, a request packet in which an address size value of zero is set and the address field is omitted is transmitted. When an address is necessary for the request packet, a request packet in which an address size value other than zero is set and an address, size of which is indicated by the address size value is set in the address field is transmitted. This enables the request packet having the same field configuration to be used as different types of packets merely by changing the setting of the address size value in the address size field. Therefore, efficient data transfer can be realized using a small number of types of packets.

With this data transfer control device, the request packet may include a response request field for informing whether or not to perform handshake transfer using an acknowledge packet, and the link controller may set a response request value indicating that response is not requested in the response request field when setting an address size value of zero in the address size field.

This enables a request packet in which the address size value is zero and the address field is omitted to be transmitted without performing handshake transfer, whereby the data transfer efficiency can be further increased. In this case, the link controller may read a response request value set in the response request field of the received request packet, may direct transmission of an acknowledge packet for the request packet when a response request value of "response requested" (a response request value indicating that response is requested) is set in the response request field, and may not direct transmission of an acknowledge packet for the request packet when a response request value of "response not requested" (a response request value indicating that response is not requested) is set in the response request field.

An electronic instrument according to a further embodiment of the present invention includes:

any one of the above data transfer control devices; and at least one of a communication device, a processor, an imaging device, and a display device.

The embodiments of the present invention are described below in detail with reference to the drawings. Note that the embodiments described hereunder do not in any way limit the scope of the invention defined by the claims laid out herein. Note also that not all of the elements of these embodiments should be taken as essential requirements to the means of the present invention.

1. Configuration of Data Transfer Control Device

FIG. 1 shows a configuration example of a data transfer control device (bus bridge device or interface device) in this embodiment. The data transfer control device in this embodiment is not limited to the configuration shown in FIG. 1. Some of the circuit blocks shown in FIG. 1 may be omitted, or the connection configuration between the circuit blocks may be changed, or a circuit block differing from the circuit blocks shown in FIG. 1 may be added. For example, an interface circuit 110 of a target-side data transfer control device 30 may be omitted. Or, an interface circuit may be provided in a host-side data transfer control device 10. In this embodiment, the host supplies a clock signal, and the target operates using the supplied clock signal as a system clock signal.

The data transfer control devices 10 and 30 transfer data by serial transfer through a serial bus. In more detail, the data transfer control devices 10 and 30 transmit and receive packets by current-driving (or voltage-driving) differential signal lines of the serial bus.

The host-side data transfer control device 10 includes a link controller 90 (link layer circuit) which performs link layer processing. The link controller 90 generates a request packet (write request packet or read request packet) to be transmitted to the data transfer control device 30 (partner device in a broad sense) connected through the serial bus. The link controller 90 directs a transceiver 20 to transmit the generated request packet. Specifically, the link controller 90 initiates and executes a transmission transaction.

The host-side data transfer control device 10 includes the transceiver 20 (physical layer circuit) which performs physical layer processing. The transceiver 20 performs processing of transmitting the request packet of which transmission has been directed by the link controller 90 to the target-side data transfer control device 30 connected through the serial bus. The transceiver 20 also performs processing of receiving a request packet from the target-side data transfer control device 30. In this case, the link controller 90 analyzes the received request packet and performs the link layer (transaction layer) processing.

The target-side data transfer control device 30 includes a transceiver 40 (physical layer circuit) which performs physical layer processing. The transceiver 40 performs processing of receiving a request packet from the data transfer control device 10 (partner device in a broad sense) connected through the serial bus. The transceiver 40 also performs processing of transmitting a request packet to the data transfer control device 10. In this case, a link controller 100 generates a request packet to be transmitted, and directs the transceiver 40 to transmit the generated request packet.

The target-side data transfer control device 30 includes the link controller 100 (link layer circuit) which performs link layer processing. The link controller 100 analyzes a request packet received by the transceiver 40 and performs the link layer (transaction layer) processing.

The target-side data transfer control device 30 includes the interface circuit 110. The interface circuit 110 is a circuit for transferring data through a bus (parallel bus) differing from the serial bus. As examples of such a bus, a bus which realizes an RGB interface (stream interface in a broad sense), a bus which realizes an MPU interface (command/data interface in a broad sense), and the like can be given, as described later. The data transfer control device 30 can be provided with a bus bridge function by providing the interface circuit 110.

The configuration and the operation in this embodiment in the case where the host-side data transfer control device 10 transmits a request packet to the target-side data transfer control device 30 are described below for convenience of description. However, the configuration and the operation in the case where the target-side data transfer control device 30 transmits a request packet to the host-side data transfer control device 10 are the same as described below.

2. Packet Format

FIGS. 2A to 3B show format examples of packets transferred by the data transfer control device in this embodiment. The field configuration and the field arrangement of each packet are not limited to the examples shown in FIGS. 2A to 3B. Various modifications and variations are possible.

A write request packet shown in FIG. 2A is a packet for requesting writing of data (including command). The write request packet includes a header field including response request, packet type, label, retry, address size, synchronization code, and data length fields, an address field for designating a write destination (access destination in a broad sense), a write data field, and a cyclic redundancy check (CRC) field.

An acknowledge packet (handshake packet) shown in FIG. 2B is a packet for transmitting acknowledgement (ACK) or negative acknowledgement (NACK). The acknowledge packet includes a header field including packet type, label, retry, and response code fields, and a CRC field.

A read request packet shown in FIG. 3A is a packet for requesting reading of data. The read request packet includes a header field including response request, packet type, label, retry, address size, and data length fields, an address field for designating a read destination (access destination in a broad sense), and a CRC field.

A response packet shown in FIG. 3B is a packet for responding to the read request packet, and includes a header field including packet type, label, and retry fields, a response data field, and a CRC field.

The response request field included in the request packet (write request packet shown in FIG. 2A or read request packet shown in FIG. 3A) is a field for informing whether or not to perform handshake transfer using an acknowledge packet (ACK or NACK).

In more detail, the response request field in the write request packet shown in FIG. 2A is a field for notifying the partner device whether or not an acknowledge packet is necessary. As shown in FIG. 4A, the response request field indicates that an acknowledge packet is unnecessary when a response request value (response request flag) in the response request field is "0", and indicates that an acknowledge packet is necessary when the response request value is "1", for example. In the read request packet shown in FIG. 3A, the response request field is a field for informing whether or not the device transmits an acknowledge packet for the response packet from the partner device.

The packet type field is a field for informing the packet type. In this embodiment, the write request packet, the read request packet, the response packet, and the acknowledge packet are provided as the packet types, as shown in FIG. 4B. In this embodiment, since packets exclusively assigned to various transfers such as an isochronous packet and an asynchronous transfer packet in IEEE 1394 or the like are not provided, the number of types of packets is small in comparison with IEEE 1394 or the like. This embodiment can deal with various situations even if the number of types of packets is small by providing the response request field and the address size field, thereby enabling efficient data transfer. Specifically, the request type of the packet having the same field configuration can be changed by rewriting the value in the field. For example, the request packet having the same field configuration can be used as an isochronous packet or an asynchronous transfer packet by rewriting the response request field.

The label field is a field for setting a label for distinguishing the current transaction from other transactions. An arbitrary label value can be added to one transaction, and only that label value can be used in that transaction. For example, the host can set an arbitrary label value in the range from 0 to 7, and the target can set an arbitrary label value in the range from 8 to F.

The retry field is a field for informing whether or not the current transaction performs a retry. A retry value of "1" is set in this field when performing a retry.

The address size field is a field for informing the size of an address set in the address field of the request packet (write request packet or read request packet). In more detail, as shown in FIG. 4C, when the address size value in the address size field is "0", the request packet does not include the address field. When the address size value is "1", "2", "3", or "4", the address field of the request packet is one byte, two bytes, three bytes, or four bytes, respectively. For example, when the address size value is "4", the address in the address field is 4×8=32 bits, whereby it is possible to deal with a 32-bit address space.

The synchronization code field is a field for informing whether or not the request packet includes a synchronization code Sync and indicating the type of the synchronization code (Vsync or Hsync), as shown in FIG. 4D. The data length field is a field for informing the data length of write data or read data.

The address field is a field for informing the address of the data write or read destination. The size of the address field is the size designated in the address size field (0 to 4 bytes).

The CRC field is a field for checking an error of the packet header and data. As a CRC generation function, a standard equation (algorithm) such as $G(X)=X^{16}+X^{12}+X^5+1$ may be used, for example.

The response code field of the acknowledge packet is a field for informing the reception state of the received packet. For example, the response code field indicates that reception has succeeded when a response code value is "F", and indicates that reception has failed when the response code value is "0".

The response data field of the response packet is a field for setting read data during reading requested by the read request packet. For example, when the device has transmitted the read request packet to the partner device, the partner device sets read data corresponding to the read request packet in the response data field of the response packet, and transmits the response packet.

3. Response Request Field

In this embodiment, the request packet includes the response request field for informing whether or not to perform handshake transfer using an acknowledge packet, as shown in FIGS. 2A and 3A. When the host (or target; hereinafter the same) has transmitted a request packet in which "response requested" is set in the response request field to the target (or host; hereinafter the same), the target transmits an acknowledge packet (ACK or NACK) to the host as a response to the request packet. When the host has transmitted a request packet in which "response not requested" is set in the response request field to the target, the target does not transmit an acknowledge packet to the host. This realizes efficient data transfer such as stream transfer.

In more detail, the host-side link controller 90 shown in FIG. 1 generates a request packet in which a response request value of "response requested" (a response request value indicating that response is requested) ("1") is set in the response request field when performing handshake transfer using an acknowledge packet. The link controller 90 then performs transmission processing of the generated request packet. Specifically, the link controller 90 directs the transceiver 20 to transmit the request packet. The transceiver 20 transmits the generated request packet to the target-side data transfer control device 30.

The host-side link controller 90 generates a request packet in which a response request value of "response not requested" (a response request value indicating that response is not requested) ("0") is set in the response request field when not performing handshake transfer using an acknowledge packet. The link controller 90 then performs transmission processing of the generated request packet. Specifically, the link controller 90 directs the transceiver 20 to transmit the request packet. The transceiver 20 transmits the generated request packet to the data transfer control device 30.

After the host-side transceiver 20 has transmitted a request packet and the target-side transceiver 40 has received the request packet, the target-side link controller 100 reads the response request value set in the response request field of the received request packet. The link controller 100 performs transmission processing of an acknowledge packet (see FIG. 2B) for the request packet when a response request value of "response requested" ("1") is set in the response request field of the received request packet. Specifically, the link controller 100 initiates and executes a transmission transaction of an acknowledge packet, and directs the transceiver 40 to transmit an acknowledge packet.

When a response request value of "response not requested" ("0") is set in the response request field, the target-side link controller 100 does not perform transmission processing of an acknowledge packet for the request packet. Specifically, the link controller 100 does not direct transmission of an acknowledge packet.

When a request packet in which a response request value of "response requested" is set has been transmitted, the host-side link controller 90 starts a transaction of the next request packet on condition that an acknowledge packet has been received from the target-side data transfer control device 30 (partner device). When a request packet in which a response request value of "response not requested" is set has been transmitted, the host-side link controller 90 starts a transaction of the next request packet without waiting for reception of an acknowledge packet from the data transfer control device 30.

When the request packet is the read request packet shown in FIG. 3A, the following processing is performed.

Specifically, when the host-side link controller 90 has directed transmission of a read request packet in which a response request value of "response requested" is set and has received a response packet (see FIG. 3B) for the read request packet from the target-side data transfer control device 30, the link controller 90 directs the transceiver 20 to transmit an acknowledge packet for the response packet.

When the target-side link controller 100 has received a read request packet in which a response request value of "response requested" is set in the response request field, the link controller 100 directs transmission of a response packet (see FIG. 3B) for the read request packet. When the host has transmitted an acknowledge packet for the response packet, the target-side link controller 100 performs reception processing of the transmitted acknowledge packet.

As described above, in this embodiment, the request packet includes the response request field. This enables one type of request packet to be selectively used as a packet for performing handshake transfer for reliably transferring data to the partner device or a packet for performing isochronous data transfer such as stream data transfer even at the sacrifice of reliability. Specifically, a request packet having the same field configuration can be used as an asynchronous transfer packet or an isochronous transfer packet by rewriting the response request field. This makes it possible to deal with various situations while reducing the number of types of packets, whereby efficient data transfer can be realized using a small number of types of packets.

In this embodiment, when a request packet in which "response requested" is set in the response request field has been transmitted, the next transaction is not started unless an acknowledge packet is returned from the partner device. This realizes a sequence in which the request packet is retransmitted when an acknowledge packet (ACK) is not returned from the partner device or a negative acknowledge packet (NACK) is received from the partner device.

According to this embodiment, when the transmission side has transmitted a request packet in which "response not requested" is set in the response request field, the transmission side can transmit a request packet at any timing without waiting for a response from the partner device. This enables the transmission side to generate and transmit a request packet of stream data at an arbitrary timing, whereby efficient data transfer can be realized using a small number of types of packets.

Since the packet processing becomes complicated if the number of types of packets is increased, an MPU (CPU) and firmware which operates on the MPU become necessary. This makes it necessary to incorporate the MPU into the data transfer control device, whereby the scale of the data transfer control device is increased.

According to this embodiment, the number of types of packets is minimum (four types, for example), and the field arrangement and the field configuration are common. Therefore, packet analysis and packet generation can be realized using a hardware circuit having a comparatively simple configuration without providing the MPU and the firmware which operates on the MPU. For example, whether or not to perform handshake transfer using an acknowledge packet can be judged merely by reading the setting of the response request field of the request packet. This makes it unnecessary to incorporate the MPU into the data transfer control device, whereby the scale of the data transfer control device can be reduced.

4. Address Size Field

In this embodiment, the request packet includes the address size field for informing the size of an address set in the address field, as shown in FIGS. 2A and 3A. When the host (or target) has transmitted a request packet in which an address size value of zero is set in the address size field to the target (or host), the target does not read an address from the address field. This enables data transfer such as stream transfer. When the host has transmitted a request packet in which an address size value other than zero is set in the address size field to the target, the target reads an address, size of which is indicated by the address size value from the address field. This enables data transfer to the access destination determined by the address to be performed.

In more detail, when the host-side link controller 90 shown in FIG. 1 transmits a request packet which does not require an address to the target-side data transfer control device 30 (partner device), the link controller 90 generates a request packet in which an address size value of zero is set in the address size field and the address field is omitted. The link controller 90 then performs transmission processing of the generated request packet. Specifically, the link controller 90 directs the transceiver 20 to transmit the request packet. The transceiver 20 transmits the generated request packet to the target-side data transfer control device 30.

When the host-side link controller 90 transmits a request packet which requires an address to the target-side data transfer control device 30, the link controller 90 generates a request packet in which an address size value other than zero is set in the address size field and an address, size of which is indicated by the address size value is set in the address field. The link controller 90 then performs transmission processing of the generated request packet. Specifically, the link controller 90 directs the transceiver 20 to transmit the request packet. The transceiver 20 transmits the generated request packet to the target-side data transfer control device 30.

After the host-side transceiver 20 has transmitted the request packet and the target-side transceiver 40 has received the request packet, the target-side link controller 100 reads the address size value set in the address size field of the received request packet. The link controller 100 does not read an address from the address field when an address size value of zero is set in the address size field of the received request packet. The link controller 100 then transfers data by stream transfer (RGB transfer or display data transfer) which does not require addressing. In more detail, the link controller 100 accesses a first device including a stream transfer interface through the interface circuit 110 shown in FIG. 1, and performs stream transfer of data.

The stream transfer is a transfer method in which data is transferred at high speed at a constant transfer time interval by omitting consecutive handshake transfer (exchange of request and confirmation) of data transfer in block units on the assumption that data (display data, imaging data, or the like) is continuously transferred.

When an address size value other than zero is set in the address size field of the received request packet, the target-side link controller 100 reads an address, size of which is indicated by the set address size value from the address field. The link controller 100 determines the access destination corresponding to the read address by performing decode processing or the like. In more detail, when the access destination corresponding to the address obtained from the decode result is a second device including an MPU interface (data/command interface), the link controller 100 accesses the second device through the interface circuit 110 shown in FIG. 1, and transfers data or a command. When the access destination corresponding to the read address obtained from the decode result is an internal register (command register or status register) for controlling the data transfer control device or the like, the link controller 100 accesses the internal register and writes a command or reads a status.

As described above, the request packet includes the address size field in this embodiment. This provides the degrees of freedom to the setting of the address space of the system to be constructed.

According to this embodiment, a packet which does not include the address field (address space) can be generated by setting the address size value in the address size field to zero. This enables data which does not require an address such as stream data to be efficiently transferred. Specifically, small request packets in which the address field is omitted can be continuously and successively transferred through the serial bus, whereby isochronous stream transfer can be realized.

According to this embodiment, the address space can be decreased or increased corresponding to the system to be constructed, whereby overhead during data transfer can be reduced. For example, the size of the packet transferred through the serial bus can be optimized corresponding to the address space by changing the address size value in the address size field corresponding to the address space of the device connected with the interface circuit 110 shown in FIG. 1. This reduces overhead during data transfer.

In the case of setting the address size value in the address size field to zero, it is preferable to set the response request field to "response not requested". This enables the size of the packet transferred through the serial bus to be reduced and handshake transfer using an acknowledge packet to be omitted. Therefore, stream data such as RGB data (display data) can be efficiently transferred through the serial bus.

5. Transaction Example

Figure 5A:
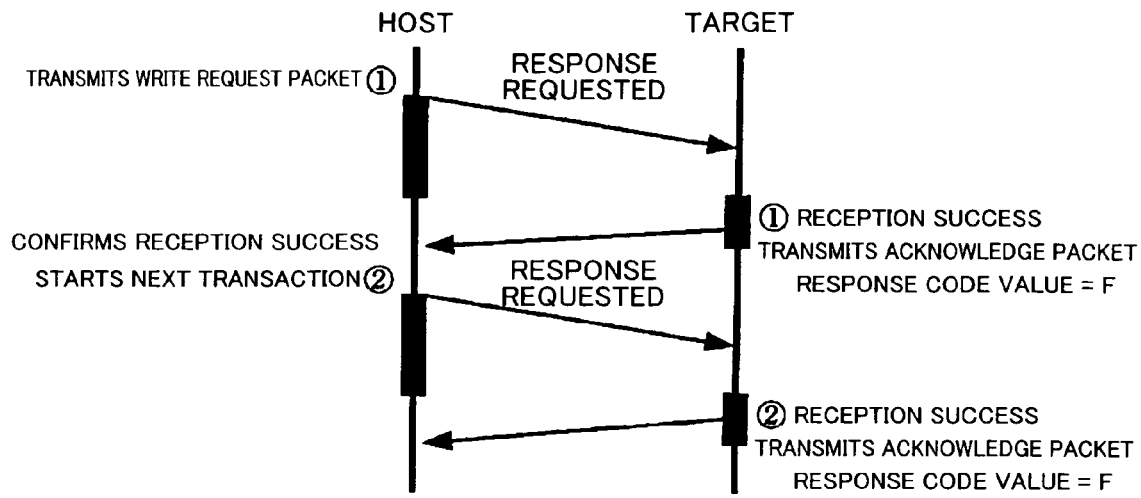
FIGS. 5A to 5C are transaction examples in this embodiment.
Figure 5B:
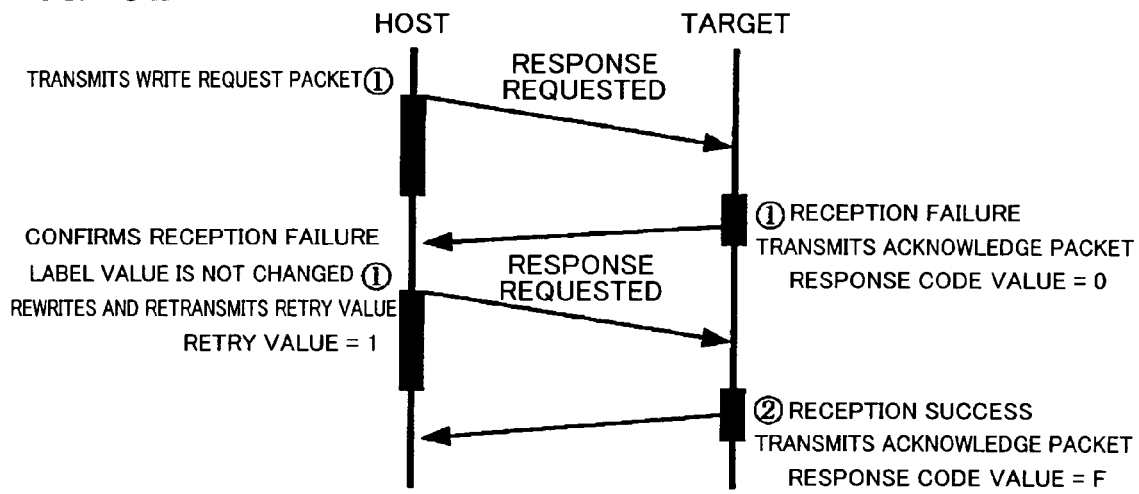
Figure 5C:
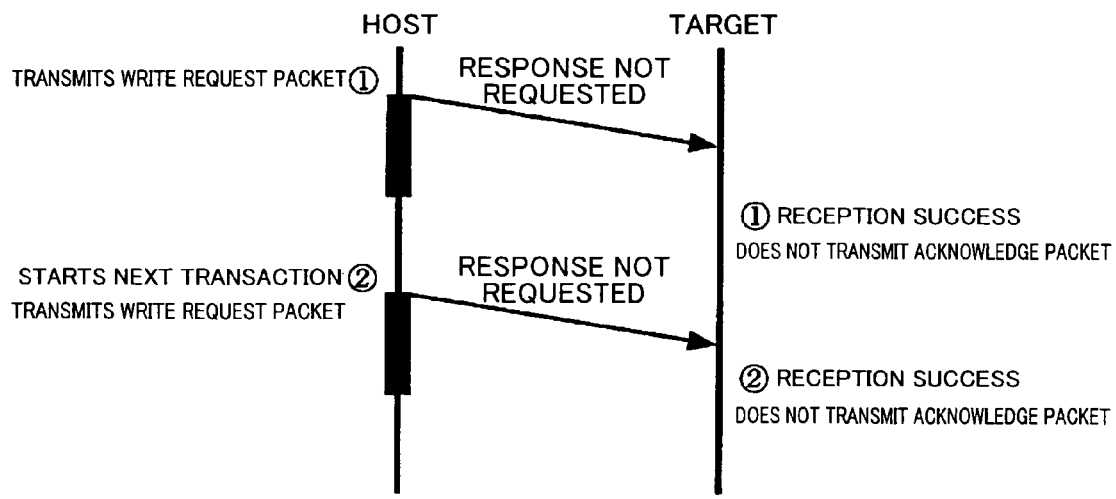

A transaction example in this embodiment is described below with reference to FIGS. 5A to 6C. FIGS. 5A, 5B, and 5C are write transaction examples using a write request packet. FIG. 5A is a transaction example when the target succeeds in receiving a write request packet in which "response requested" is set.

In FIG. 5A, the host (data transfer control device 10) generates a write request packet and transmits the generated write request packet to the target (data transfer control device 30). In more detail, the host sets a response request value of "response requested" ("1") in the response request field of the write request packet shown in FIG. 2A. The host sets the address size value in the address size field. The host sets write data (including command) in the write data field, and sets the address of the access destination (write destination) in the address field. The host transmits the write request packet in which each field is set as described above to the target.

When the target has received the write request packet, since "response requested" is set in the response request field, the target generates the acknowledge packet shown in FIG. 2B, and transmits the generated acknowledge packet to the host. In this case, since the target has succeeded in receiving the write request packet, the target transmits an acknowledge packet in which a response code value of "F" which indicates the reception success is set to the host. Upon confirming the reception success of the write request packet by the response code value "F" of the acknowledge packet received from the target, the host starts the next transaction and performs transmission processing of the next request packet.

FIG. 5B is a transaction example when the target fails to receive a write request packet in which "response requested" is set. In FIG. 5B, since the target has failed to receive the write request packet, the target transmits an acknowledge packet (negative acknowledge packet) in which a response code value of "0" which indicates the reception failure is set to the host. Upon confirming the reception failure of the write request packet by the response code value "0" of the acknowledge packet (negative acknowledge packet) received from the target, the host performs retransmission processing of the write request packet. In more detail, the host rewrites the retry value in the retry field from "0" to "1" without changing the label value in the label field of the write request packet, and retransmits the write request packet to the target. When the target has succeeded in receiving the retransmitted write request packet, the target transmits an acknowledge packet in which a response code value of "F" is set to the host.

FIG. 5C is a transaction example when the host transmits a write request packet in which "response not requested" is set to the target. In FIG. 5C, the host sets a response request value of "response not requested" ("0") in the response request field of the write request packet. The host sets the address size value such as zero in the address size field. The host sets write data (including command) in the write data field. In this case, since the address size value in the address size field is set to zero, the write request packet is a packet which does not include the address field.

When the target has received the write request packet, since "response not requested" is set in the response request field, the target neither generates an acknowledge packet nor performs transmission processing. Since the address size value of the write request packet is zero and the address field is omitted, the target transfers data by stream transfer. Specifically, the target accesses the first device including a stream transfer interface through the interface circuit 110 shown in FIG. 1, and performs stream transfer of data.

Since the host has transmitted the request packet in which "response not requested" is set, the host starts the next transaction without waiting for reception of an acknowledge packet from the target (partner device), and performs transmission processing of the next request packet. This enables efficient stream transfer without handshake transfer to be realized.

Figure 6A:
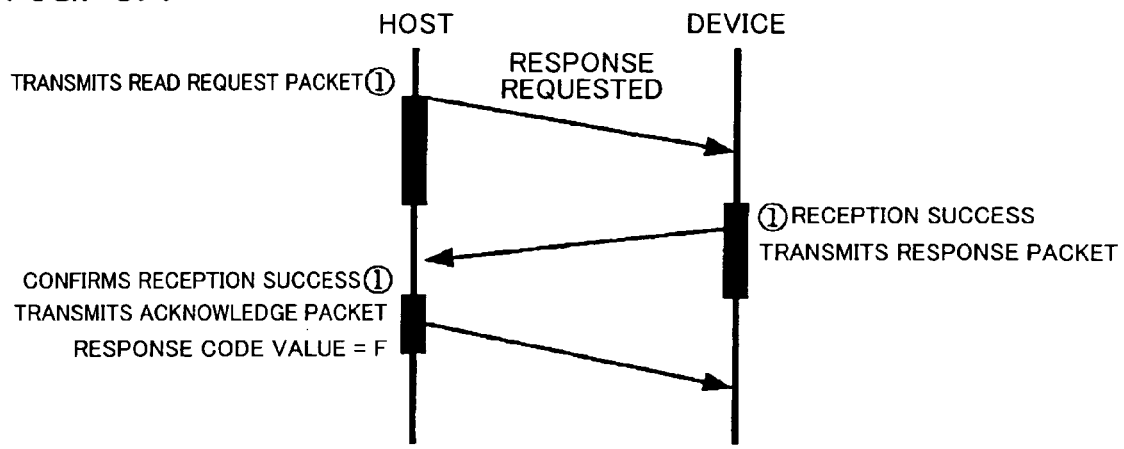
FIGS. 6A to 6C are transaction examples in this embodiment.
Figure 6B:
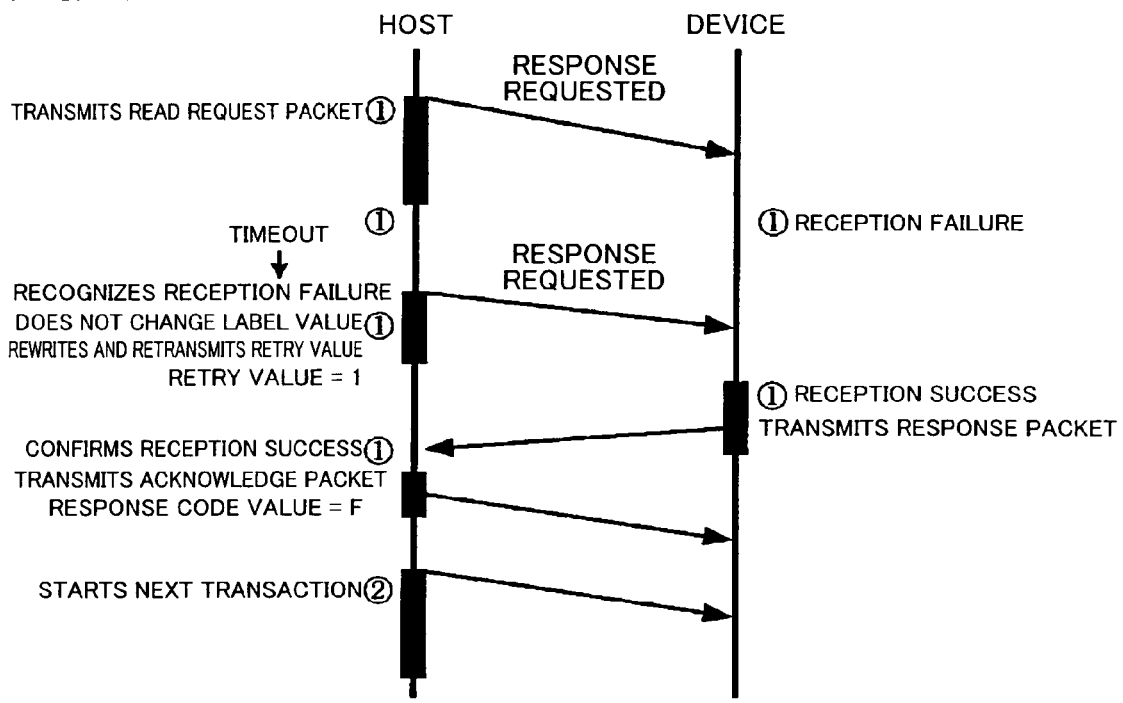
Figure 6C:
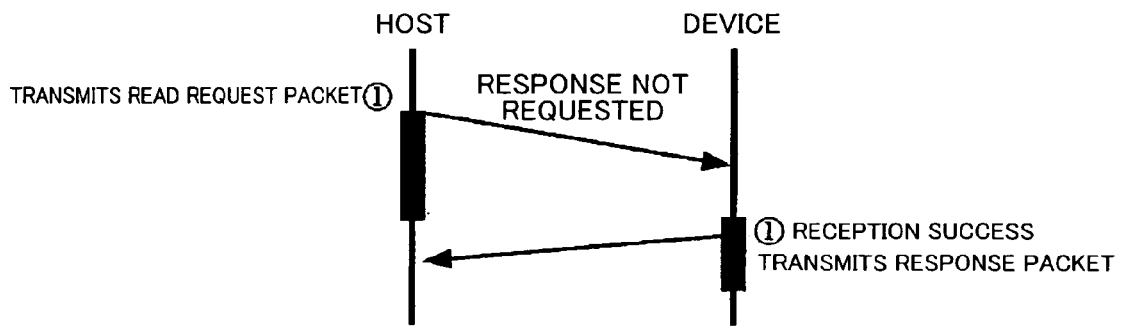

FIGS. 6A, 6B, and 6C are read transaction examples using a read request packet. FIG. 6A is a transaction example when the target succeeds in receiving a read request packet in which "response requested" is set.

In FIG. 6A, the host generates a read request packet and transmits the generated read request packet to the target. In more detail, the host sets a response request value of "response requested" ("1") in the response request field of the read request packet shown in FIG. 3A. The host sets the address size value in the address size field. The host sets the address of the access destination (read destination) in the address field. The host transmits the read request packet in which each field is set as described above to the target.

When the target has succeeded in receiving the read request packet, the target transmits the response packet shown in FIG. 3B. Read data is set in the read data field of the response packet. In this case, the read data is data read from the access destination (read destination) determined by the address in the read request packet received from the host, for example. In FIG. 6A, "response requested" is set in the response request field of the read request packet transmitted from the host. Therefore, when the host has succeeded in receiving the response packet, the host generates an acknowledge packet and transmits the generated acknowledge packet to the target. In this case, since the host has succeeded in receiving the response packet, the host transmits an acknowledge packet in which a response code value of "F" which indicates the reception success is set to the target.

FIG. 6B is a transaction example when the target fails to receive a read request packet in which "response requested" is set. In FIG. 6B, since the target has failed to receive the read request packet, the host cannot receive a response packet from the target. When a timeout occurs after a predetermined period of time, the host recognizes the target's reception failure, and performs retransmission processing of the read request packet. In more detail, the host rewrites the retry value in the retry field from "0" to "1" without changing the label value in the label field of the read request packet, and retransmits the read request packet to the target. When the target has succeeded in receiving the retransmitted read request packet, the target transmits a response packet to the host. When the host has succeeded in receiving the response packet, the host generates an acknowledge packet in which a response code value of "F" which indicates the reception success is set, and transmits the generated acknowledge packet to the target. The host then starts the next transaction and performs transmission processing of the next request packet.

FIG. 6C is a transaction example when the host transmits a read request packet in which "response not requested" is set to the target. In FIG. 6C, the host sets a response request value of "response not requested" ("0") in the response request field of the read request packet. The host sets the address size value such as zero in the address size field. When the address size value is set to zero, the read request packet is a packet which does not include the address field.

When the target has received the read request packet, the target transmits a response packet to the host. Read data is set in the read data field of the response packet. In this case, the read data is data read from the first device including a stream transfer interface, for example.

In FIG. 6C, "response not requested" is set in the response request field of the read request packet transmitted from the host. Therefore, even if the host has received the response packet from the target, the host does not transmit an acknowledge packet to the target. The host then starts the next transaction and performs transmission processing of the next request packet. This enables stream transfer without handshake transfer to be realized.

6. Data Transfer Method Using Differential Signals

Figure 7:
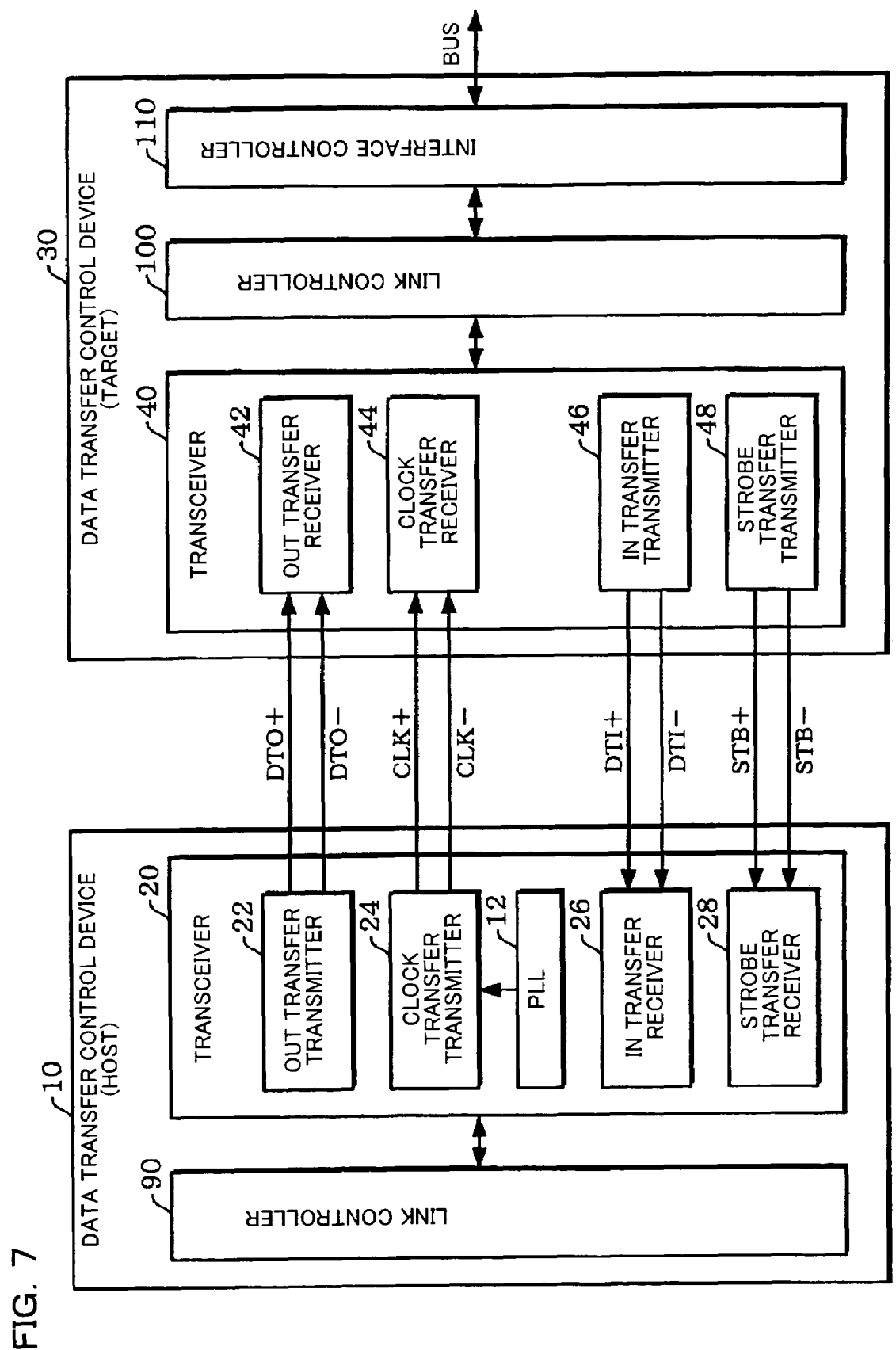
FIG. 7 is illustrative of serial transfer in this embodiment.

A serial transfer method in this embodiment is described below with reference to FIG. 7. In FIG. 7, DTO+ and DTO− indicate data (OUT data) output from the host (data transfer control device 10) to the target (data transfer control device 30). CLK+ and CLK− indicate clock signals supplied from the host to the target. The host outputs the data DTO+/− in synchronization with the edge (rising edge, for example, but may be falling edge) of the clock signals CLK+/−. Therefore, the target can sample and capture the data DTO+/− using the clock signals CLK+/−. In FIG. 7, the target operates based on the clock signals CLK+/− supplied from the host. Specifically, the clock signals CLK+/− serve as the system clock signals of the target. Therefore, a phase locked loop (PLL) circuit 12 (clock generation circuit in a broad sense) is provided in the host, and is not provided in the target.

DTI+ and DTI− indicate data (IN data) output from the target to the host. STB+ and STB− indicate strobes (clock signals in a broad sense) supplied from the target to the host. The target generates the strobes STB+/− based on the clock signals CLK+/− supplied from the host, and outputs the generated strobes STB+/−. The target outputs the data DTI+/− in synchronization with the edge (rising edge, for example, but may be falling edge) of the strobes STB+/−. Therefore, the host can sample and capture the data DTI+/− using the strobes STB+/−.

Each of the data DTO+/−, the clock signals CLK+/−, the data DTI+/−, and the strobes STB+/− is transmitted by causing a transmitter circuit (driver circuit) to current-drive the corresponding differential signal line. In order to realize transfer at higher speed, two or more pairs of the DTO+/− differential signal lines and the DTI+/− differential signal lines may be provided.

The host-side transceiver 20 includes OUT transfer (data transfer in a broad sense) and clock transfer transmitter circuits 22 and 24, and IN transfer (data transfer in a broad sense) and strobe transfer (clock transfer in a broad sense) receiver circuits 26 and 28. The target-side transceiver 40 includes OUT transfer and clock transfer receiver circuits 42 and 44, and IN transfer and strobe transfer transmitter circuits 46 and 48. A configuration in which some of these circuit blocks are omitted may be employed.

The OUT transfer and clock transfer transmitter circuits 22 and 24 respectively transmit the data DTO+/− and the clock signals CLK+/− by current-driving the DTO+/− differential signal lines and the CLK+/− differential signal lines. The OUT transfer and clock transfer receiver circuits 42 and 44 respectively receive the data DTO+/− and the clock signals CLK+/− by performing a current/voltage conversion based on the current which flows through the DTO+/− differential signal lines and the CLK+/− differential signal lines, and performing comparison processing (differential amplification processing) between differential voltage signals (first and second voltage signals) obtained by the current/voltage conversion.

The IN transfer and clock transfer transmitter circuits 46 and 48 respectively transmit the data DTI+/− and the strobes STB+/− by current-driving the DTI+/− differential signal lines and the STB+/− differential signal lines. The IN transfer and strobe transfer receiver circuits 26 and 28 respectively receive the data DTI+/− and the strobes STB+/− by performing a current/voltage conversion based on the current which flows through the DTI+/− differential signal lines and the STB+/− differential signal lines, and performing comparison processing (differential amplification processing) between differential voltage signals (first and second voltage signals) obtained by the current/voltage conversion.

7. Configuration Example of Transceiver and Link Controller

Figure 8:
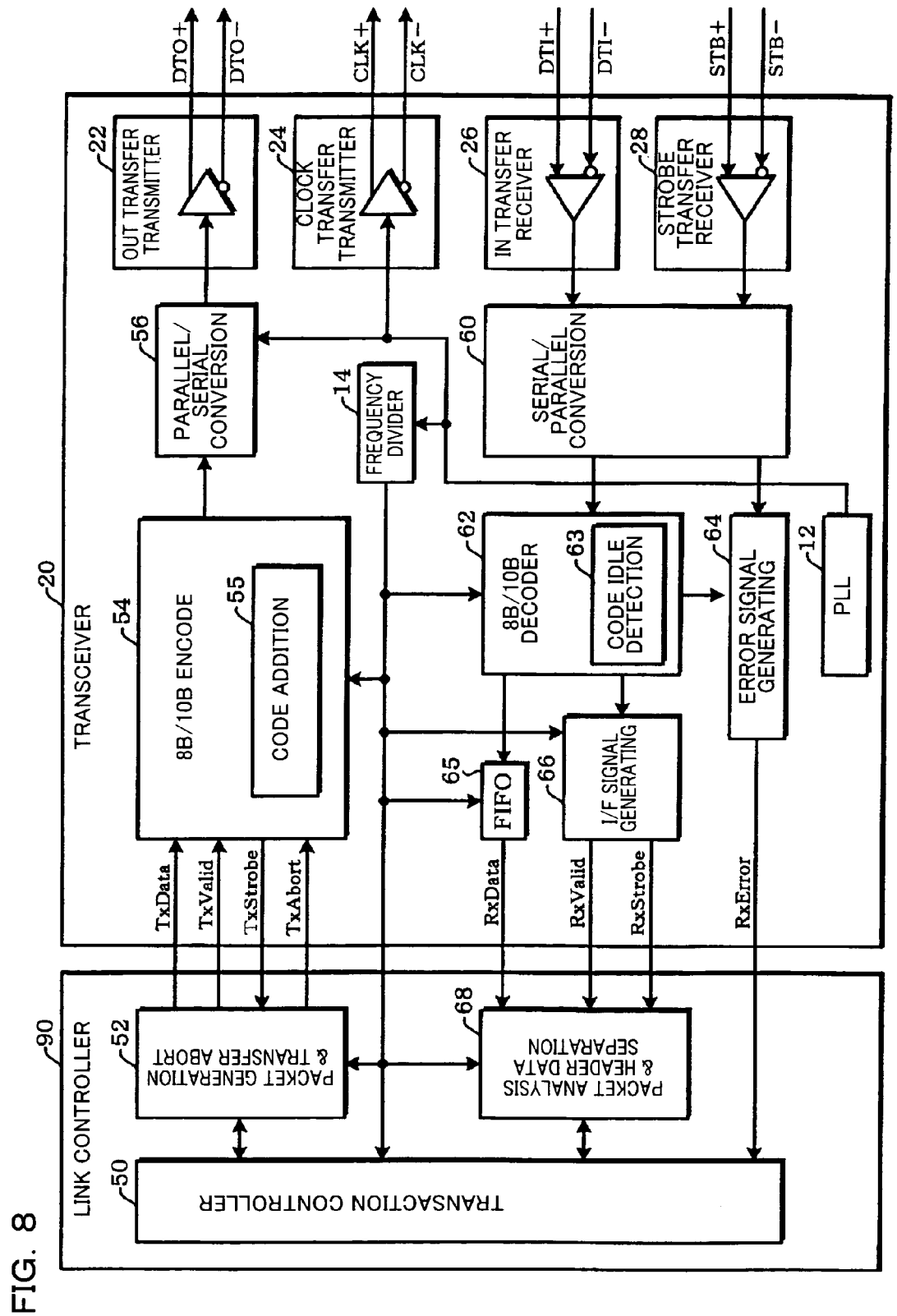
FIG. 8 is a detailed example of a host-side transceiver and link controller.
Figure 9:
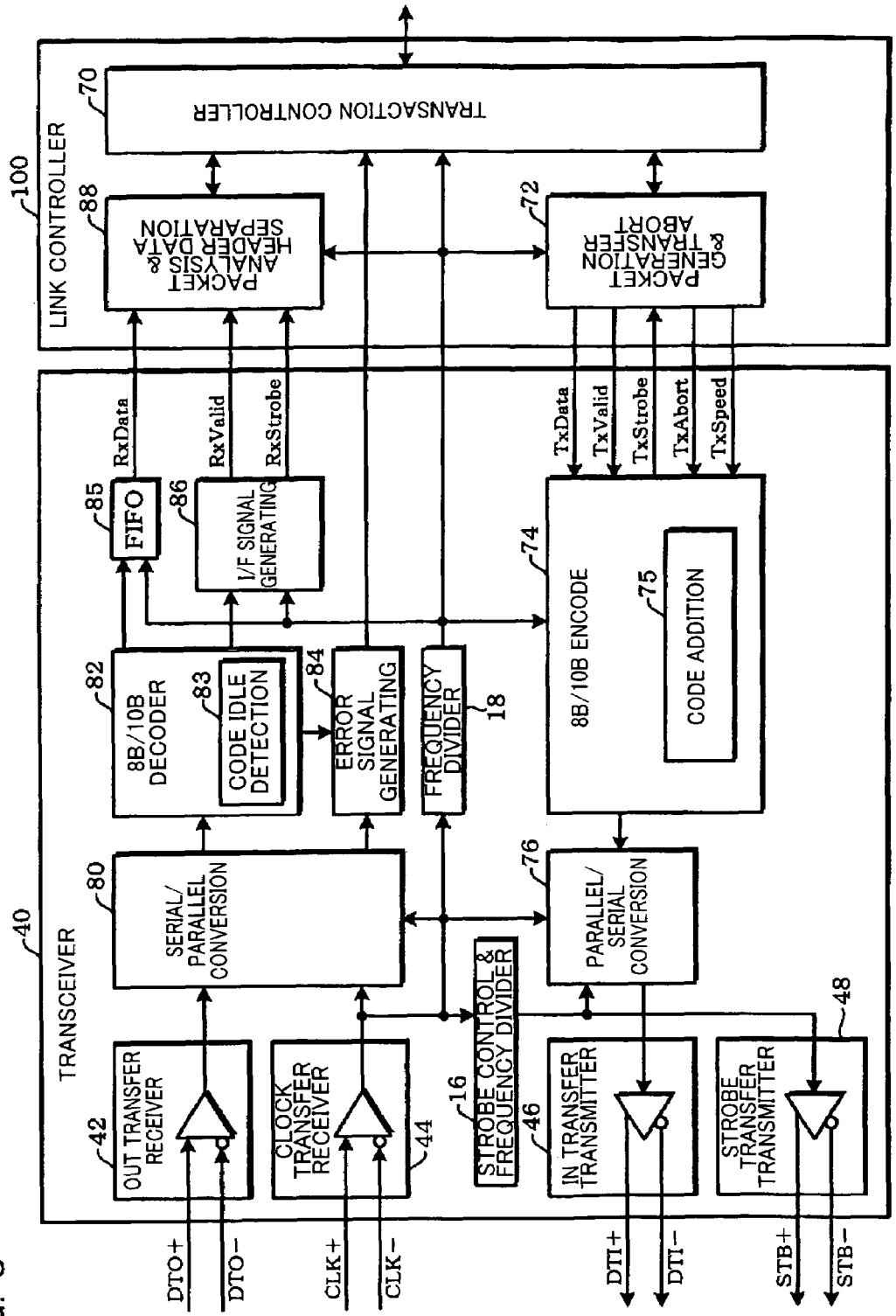
FIG. 9 is a detailed example of a target-side transceiver and link controller.

FIGS. 8 and 9 show detailed configuration examples of the host-side transceiver 20 and link controller 90 and the target-side transceiver 40 and link controller 100. The transceiver and the link controller in this embodiment are not limited to the configurations shown in FIGS. 8 and 9. Some of the circuit blocks shown in FIGS. 8 and 9 may be omitted, or the connection configuration between the circuit blocks may be changed, or a circuit block differing from the circuit blocks shown in FIGS. 8 and 9 may be added.

FIG. 8 shows a configuration example of the host-side transceiver 20 and link controller 90. In FIG. 8, a transaction controller 50 included in the link controller 90 performs transaction layer processing of data transfer. In more detail, the transaction controller 50 directs transfer of packets such as a request packet and an acknowledge packet.

A packet generation & transfer abort circuit 52 included in the link controller 90 performs processing of generating a packet (packet header) of which transfer is directed by the transaction controller 50, and processing of aborting data transfer. In more detail, the packet generation & transfer abort circuit 52 receives a signal TxStrobe from an 8B/10B encoder circuit 54, and outputs data TxData and signals TxValid and TxAbort. The data TxData is transmission data which makes up a packet, such as 8-bit parallel data. The signal TxValid is a signal which becomes active in a period from the start to the end of a transmission packet, and is a signal which indicates completion of transmission preparation (signal which directs transmission). The signal TxStrobe is a signal which indicates completion of data reception. The signal TxAbort is a signal which becomes active when aborting data transmission.

The 8B/10B encoder circuit 54 included in the transceiver 20 performs encode processing using an 8B/10B encoding method (encoding method which expands the bit width in a broad sense). A code addition circuit 55 included in the 8B/10B encoder circuit 54 performs processing of adding a preamble code, a start code, or an abort code obtained by 8B/10B encoding. The encoding method which expands the bit width is not limited to the 8B/10B encoding method, and may be an encoding method which expands K bits to L (L>K) bits, for example.

A parallel/serial conversion circuit 56 included in the transceiver 20 converts parallel data received from the 8B/10B encoder circuit 54 to serial data. The OUT transfer transmitter circuit 22 included in the transceiver 20 receives the serial data from the parallel/serial conversion circuit 56, and transmits the data by driving the DTO+/− differential signal lines. The clock transfer transmitter circuit 24 included in the transceiver 20 receives a clock signal generated by the PLL circuit 12, and transmits the clock signal by driving the CLK+/− differential signal lines. The transmitter circuits 22 and 24 are formed by analog circuits for current-driving (or voltage-driving) the differential signal lines. The clock signal generated by the PLL circuit 12 is divided by a frequency divider circuit 14, and is supplied to the circuit blocks (blocks which process parallel data) in the transceiver 20 and the link controller 90.

The IN transfer receiver circuit 26 included in the transceiver 20 receives data transferred through the DTI+/− differential signal lines, and outputs the received serial data to a serial/parallel conversion circuit 60. The strobe transfer receiver circuit 28 included in the transceiver 20 receives strobes (clock signals) transferred through the STB+/− differential signal lines, and outputs the received strobes. The receiver circuits 26 and 28 are formed by analog circuits which detect the drive current (or drive voltage) of the differential signal lines.

The serial/parallel conversion circuit 60 included in the transceiver 20 converts serial data transferred through the DTI+/− differential signal lines to parallel data. In more detail, the serial/parallel conversion circuit 60 samples data transferred through the DTI+/− differential signal lines based on the strobes (clock signals) transferred through the STB+/− differential signal lines. The serial/parallel conversion circuit 60 converts the sampled serial data to parallel data. The serial/parallel conversion circuit 60 also performs preamble code detection processing.

An 8B/10B decoder circuit 62 included in the transceiver 20 performs decode processing of the 8B/10B encoding method. A code idle detection circuit 63 included in the 8B/10B decoder circuit 62 performs detection processing of the start code or the abort code, and detection processing of the idle state of the differential signal lines.

An error signal generation circuit 64 included in the transceiver 20 generates an error signal RxError when a preamble error is detected by the serial/parallel conversion circuit 60 or a disparity error or a decode error is detected by the code idle detection circuit 63, and outputs the error signal RxError to the transaction controller 50.

A FIFO 65 included in the transceiver 20 receives the decoded data from the 8B/10B decoder circuit 62, and outputs the received data to a packet analysis & header data separation circuit 68 as data RxData. An I/F signal generation circuit 66 included in the transceiver 20 generates an interface signal such as a signal RxValid or RxStrobe, and outputs the interface signal to the packet analysis & header data separation circuit 68. The data RxData is 8B/10B decoded reception data such as 8-bit parallel data. The signal RxValid is a signal which becomes active in a period from the start to the end of a reception packet, and is a signal which indicates the presence of data. The signal RxStrobe is a strobe signal for supplying data to the transaction controller 50.

The packet analysis & header data separation circuit 68 included in the link controller 90 performs processing of analyzing the received packet and processing of separating the header and data of the received packet.

FIG. 9 shows a configuration example of the target-side transceiver 40 and link controller 100. The configurations and operations of circuits 70, 72, 74, 75, 76, 80, 82, 83, 84, 85, 86, and 88 shown in FIG. 9 are almost the same as the configurations and operations of the circuits 50, 52, 54, 55, 56, 60, 62, 63, 64, 65, 66, and 68 shown in FIG. 8. Therefore, description of these circuits is omitted. A signal TxSpeed is a signal for directing the transfer rate of transmission data. A strobe control & frequency divider circuit 16 included in the transceiver 40 receives the clock signal received by the clock transfer receiver circuit 44, divides the frequency of the clock signal, and outputs the clock signal to the strobe transfer transmitter circuit 48 as the strobe signal. A frequency divider circuit 18 included in the transceiver 40 receives the clock signal received by the clock transfer receiver circuit 44, and supplies the divided clock signal to the circuit blocks in the transceiver 40 and the link controller 100.

8. Details of Interface Circuit

The details of the configuration and the operation of the interface circuit 110 are described below with reference to FIGS. 10, 11A, and 11B.

Figure 10:
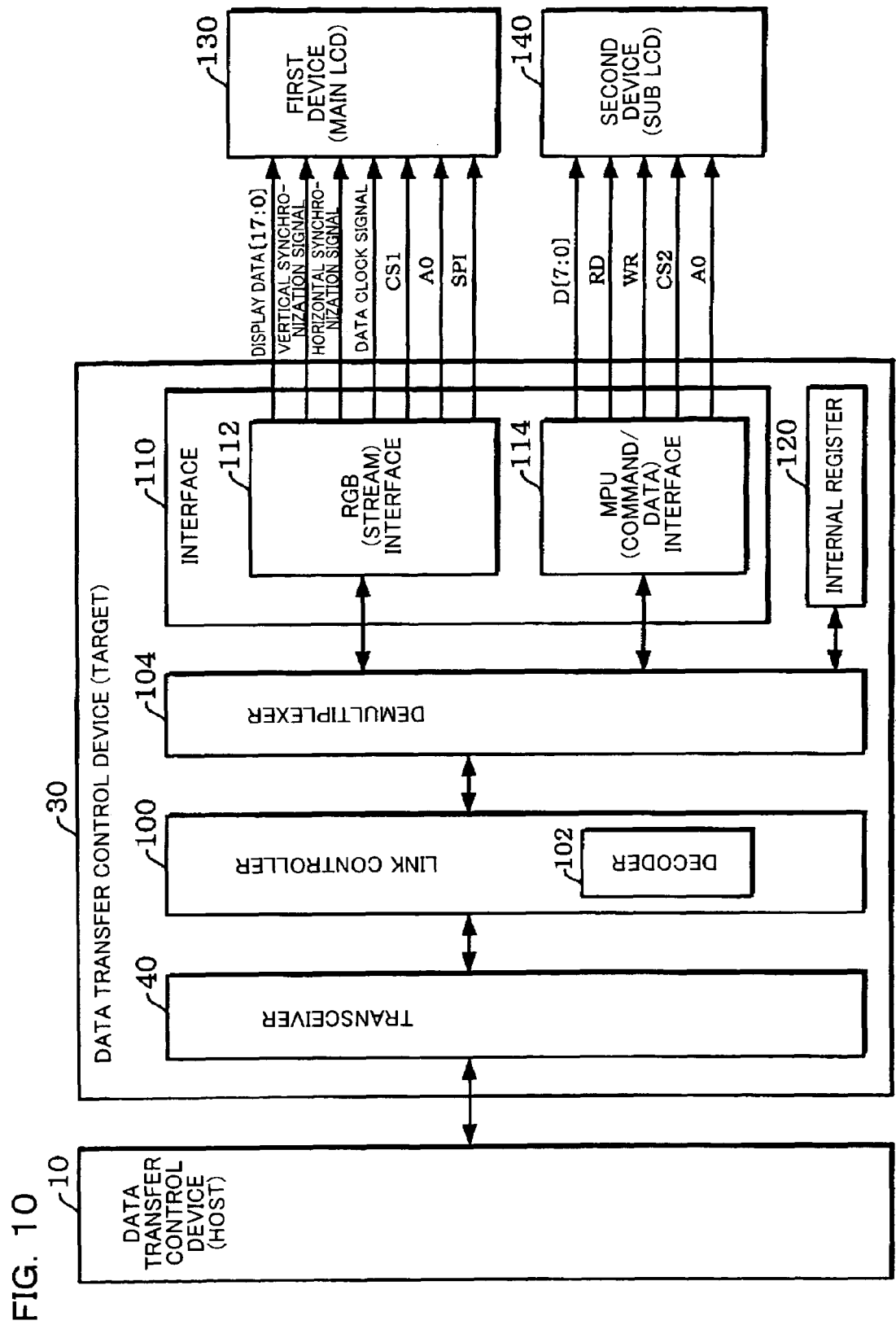
FIG. 10 is a detailed example of an interface circuit.

In FIG. 10, the link controller 100 includes a decoder 102. The decoder 102 decodes an address set in the address field of the request packet. The access destination corresponding to the read address is determined based on the decode result of the decoder 102.

In FIG. 10, the interface circuit 110 includes an RGB (stream) interface circuit 112 and an MPU (command/data) interface circuit 114. The RGB interface circuit 112 (first interface circuit in a broad sense) is a circuit for performing stream data transfer with a first device 130 (main LCD, for example) connected through a stream transfer bus (display data [17:0], vertical synchronization signal, horizontal synchronization signal, data clock signal, CS1, A0, and SPI). The MPU interface circuit 114 (second interface circuit in a broad sense) is a circuit for transferring a command or data with a second device 140 (sub LCD, for example) connected through a command/data bus (D[7:0], RD, WR, CS2, and A0).

The signals CS1 and CS2 are chip select signals. The first device 130 is chip-selected when the signal CS1 becomes active, and the second device 140 is chip-selected when the signal CS2 becomes active. The signal SPI is a serial signal used when performing serial data transfer instead of parallel transfer using the display data [17:0]. The signal A0 is one bit of an address. For example, the second device 140 judges whether information transferred using the data D[7:0] is a command or data based on the signal A0. For example, the information transferred using the data D[7:0] is judged to be a command when A0=0, and the information transferred using the data D[7:0] is judged to be data when A0=1. The signals RD and WR are a read signal and a write signal, respectively. In FIG. 10, the RGB interface bus and the MPU interface bus are separated. However, the RGB interface bus and the MPU interface bus may be a common bus. For example, the display data [17:0] and the data D[7:0], the vertical synchronization signal and the signal RD, the horizontal synchronization signal and the signal WR, the data clock signal and the signal CS2, and the signal A0 and the signal A0 are respectively transmitted through common signal lines. Specifically, the display data [17:0] is transmitted through a first signal line in a first mode, and the data D[7:0] is transmitted through the first signal line in a second mode. This reduces the number of terminals (number of pads) of the data transfer control device 30 (semiconductor IC), whereby a reduction of the scale and cost of the device can be achieved.

In FIG. 10, a demultiplexer 104 is provided between the link controller 100 and the interface circuit 110. The demultiplexer 104 connects the link controller 100 with the RGB interface circuit 112 when the access destination of the link controller 100 is the first device 130. The demultiplexer 104 connects the link controller 100 with the MPU interface circuit 114 when the access destination of the link controller 100 is the second device 140. The demultiplexer 104 connects the link controller 100 with an internal register 120 when the access destination of the link controller 100 is the internal register 120 (command register or status register) of the data transfer control device 30.

In this case, the access destination can be judged based on the address decode result of the decoder 102, the address size value in the address size field, or the like. For example, when the address size value of the request packet is set to zero, the demultiplexer 104 connects the link controller 100 with the RGB interface circuit 112. This enables the link controller 100 to access the first device 130 through the RGB interface circuit 112 and perform stream transfer of display data.

The demultiplexer 104 connects the link controller 100 with the MPU interface circuit 114 when the access destination corresponding to the read address judged based on the decode result of the decoder 102 is the second device 140. This enables the link controller 100 to access the second device 140 through the MPU interface circuit 114 and transfer data or a command.

The demultiplexer 104 connects the link controller 100 with the internal register 120 when the access destination corresponding to the read address judged based on the decode result of the decoder 102 is the internal register 120. This enables the link controller 100 to access the internal register 120 and write a command or read a status.

The operation of the interface circuit 110 is described below using timing waveform diagrams shown in FIGS. 11A and 11B. FIG. 11A shows a timing waveform diagram when performing stream transfer using the RGB interface. As indicated by A1, A2, and A3 shown in FIG. 11A, the host-side data transfer control device 10 transmits a write request packet including a vertical synchronization request, a horizontal synchronization request, and display data to the target-side data transfer control device 30 through the serial bus (DTO+/−). In this case, since an address size value of zero is set in the address size field of the write request packet, the demultiplexer 104 selects the RGB interface circuit 112 as the connection destination of the link controller 100. The selected RGB interface circuit 112 outputs the data clock signal, the vertical synchronization signal, and the horizontal synchronization signal as indicated by A4, A5, and A6 shown in FIG. 11A. As indicated by A7, the RGB data indicated by A3 which is included in the write request packet is output through the bus for the display data [17:0]. This realizes stream transfer through the RGB interface.

FIG. 11B shows a timing waveform diagram when transferring a command or data using the MPU interface. As indicated by B1 shown in FIG. 11B, the host-side data transfer control device 10 transmits a write request packet including a command or data to the target-side data transfer control device 30 through the serial bus (DTO+/−). In this case, since an address size value other than zero is set in the address size field of the write request packet, the decoder 102 of the link controller 100 decodes an address set in the address field of the write request packet. When the access destination corresponding to the address is judged to be the second device 140, the demultiplexer 104 selects the MPU interface circuit 114 as the connection destination of the link controller 100. The selected MPU interface circuit 114 causes the chip select signal CS2 and the write signal WR to become active ("0") as indicated by B2 and B3 shown in FIG. 11B. As indicated by B4, the MPU interface circuit 114 outputs the command or data indicated by B1 which is included in the write request packet through the data bus for the data D[7:0]. The command or data is written into a command register or a data register of the second device 140. This realizes command or data transfer through the MPU interface.

9. Entire Processing

Figure 12:
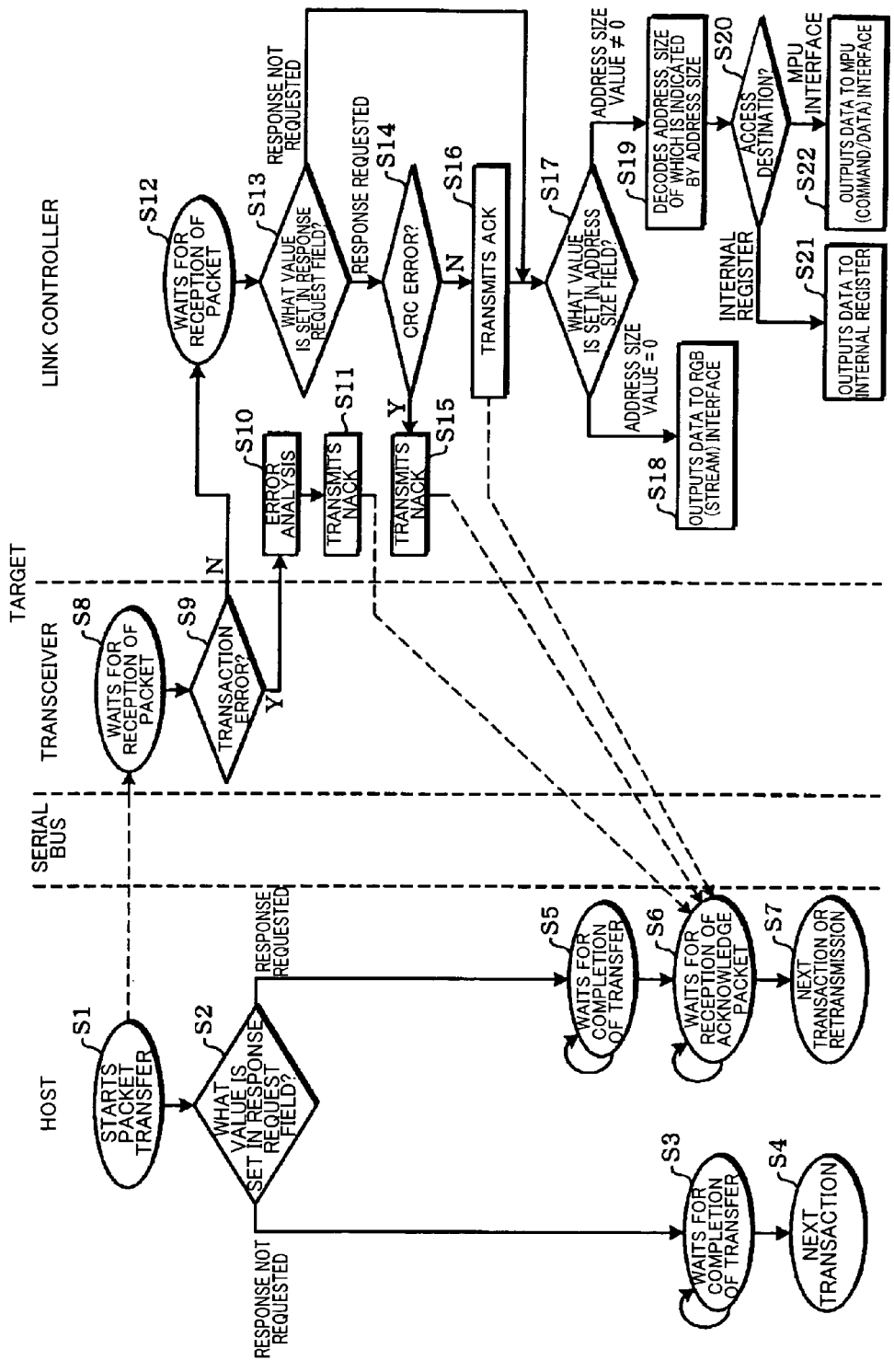
FIG. 12 is a flowchart showing a first processing example in this embodiment.

The entire processing in this embodiment is described below with reference to FIGS. 12 and 13. FIG. 12 is a flowchart showing a first processing example in this embodiment. The host starts packet transfer, and waits for completion of the packet transfer when "response not requested" is set in the response request field (steps S1, S2, and S3). When the packet transfer has been completed, the host starts the next transaction (step S4). As described above, in this embodiment, when "response not requested" is set, the next transaction is started without waiting for reception of ACK (acknowledge packet) from the partner device.

When "response requested" is set in the response request field, the host waits for completion of the packet transfer, and waits for reception of ACK after the completion of the packet transfer (steps S1, S2, S5, and S6). Upon receiving ACK or NACK, the host starts the next transaction or performs packet retransmission processing (step S7). As described above, in this embodiment, when "response requested" is set, the next transaction is started on condition that ACK has been received from the partner device.

The target-side transceiver, which has been waiting for reception of a packet, performs processing of detecting a transaction error upon receiving a request packet from the host (steps S8 and S9). In more detail, the serial/parallel conversion circuit 80 shown in FIG. 9 detects the presence or absence of a preamble error. The 8B/10B decoder circuit 82 performs 8B/10B error detection (detection of code inappropriate for 8B/10B or the like). If an error has been detected, the target-side link controller analyzes the error and transmits NACK (negative acknowledge packet) to the host (steps S10 and S11). As described above, in this embodiment, when a transaction error of the received request packet has been detected, NACK is transmitted without reading (referring to) the response request value set in the response request field.

The target-side link controller, which has been waiting for reception of a packet, reads the response request value in the response request field when a transaction error has not been detected (steps S12 and S13). When "response not requested" is set, the link controller transitions to a step S17. When "response requested" is set, the link controller detects the presence or absence of a CRC error using the cyclic redundancy check (CRC) field of the request packet (step S14). If a CRC error has been detected, the link controller transmits NACK to the host (step S15). If a CRC error has not been detected, the link controller transmits ACK to the host (step S16).

The target-side link controller then reads the address size value in the address size field, and outputs data to the RGB interface when the address size value is zero (steps S17 and S18). Specifically, stream data is output from the link controller 100 to the first device 130 in FIG. 10 through the demultiplexer 104 and the RGB interface circuit 112.

When the address size value is not zero, the link controller performs decode processing of an address, size of which is indicated by the address size (step S19). When the access destination corresponding to the read address is judged to be the internal register of the data transfer control device from the decode result, data (command) is output to the internal register (steps S20 and S21). Specifically, data (command) is output from the link controller 100 to the internal register 120 in FIG. 10 through the demultiplexer 104. When the access destination corresponding to the address is judged to be the MPU interface, data (command) is output to the MPU interface (steps S20 and S22). Specifically, data (command) is output from the link controller 100 to the second device 140 in FIG. 10 through the demultiplexer 104 and the MPU interface circuit 114.

Figure 13:
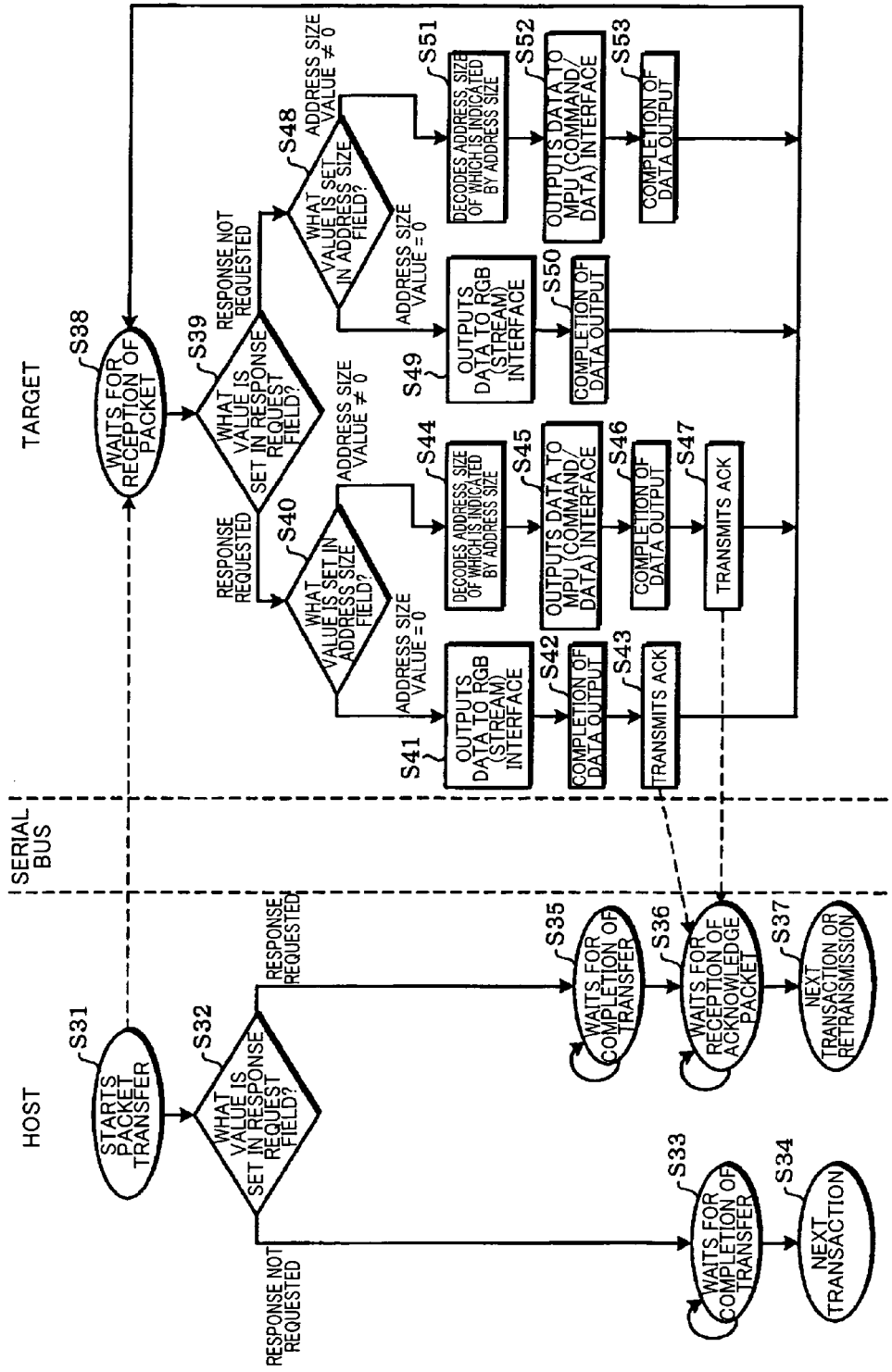
FIG. 13 is a flowchart showing a second processing example in this embodiment.

FIG. 13 is a flowchart showing a second processing example in this embodiment. The host-side processing (steps S31 to S37) shown in FIG. 13 is the same as the steps S1 to S7 shown in FIG. 12.

The target, which has been waiting for reception of a packet, reads the response request value in the response request field upon receiving a request packet from the host (steps S38 and S39). When "response requested" is set, the target reads the address size value in the address size field (step S40). When the address size value is zero, the target outputs data to the RGB interface, and transmits AKC to the host when the output of the data has been completed (steps S41, S42, and S43). When the address size value is not zero, the target performs decode processing of the address, size of which is indicated by the address size (step S44). The target then outputs data to the MPU interface, and transmits AKC to the host when the output of the data has been completed (steps S45, S46, and S47).

The target, which has been waiting for reception of a packet, reads the address size value in the address size field when "response not requested" is set in the response request field (step S48). When the address size value is zero, the target outputs data to the RGB interface, and, when the output of the data has been completed, waits for reception of a packet without transmitting AKC (steps S49 and S50). When the address size value is not zero, the target performs decode processing of the address, size of which is indicated by the address size (step S51). The target then outputs data to the MPU interface, and, when the output of the data has been completed, waits for reception of a packet without transmitting AKC (steps 52 and S53).

10. Electronic Instrument

Figure 14:
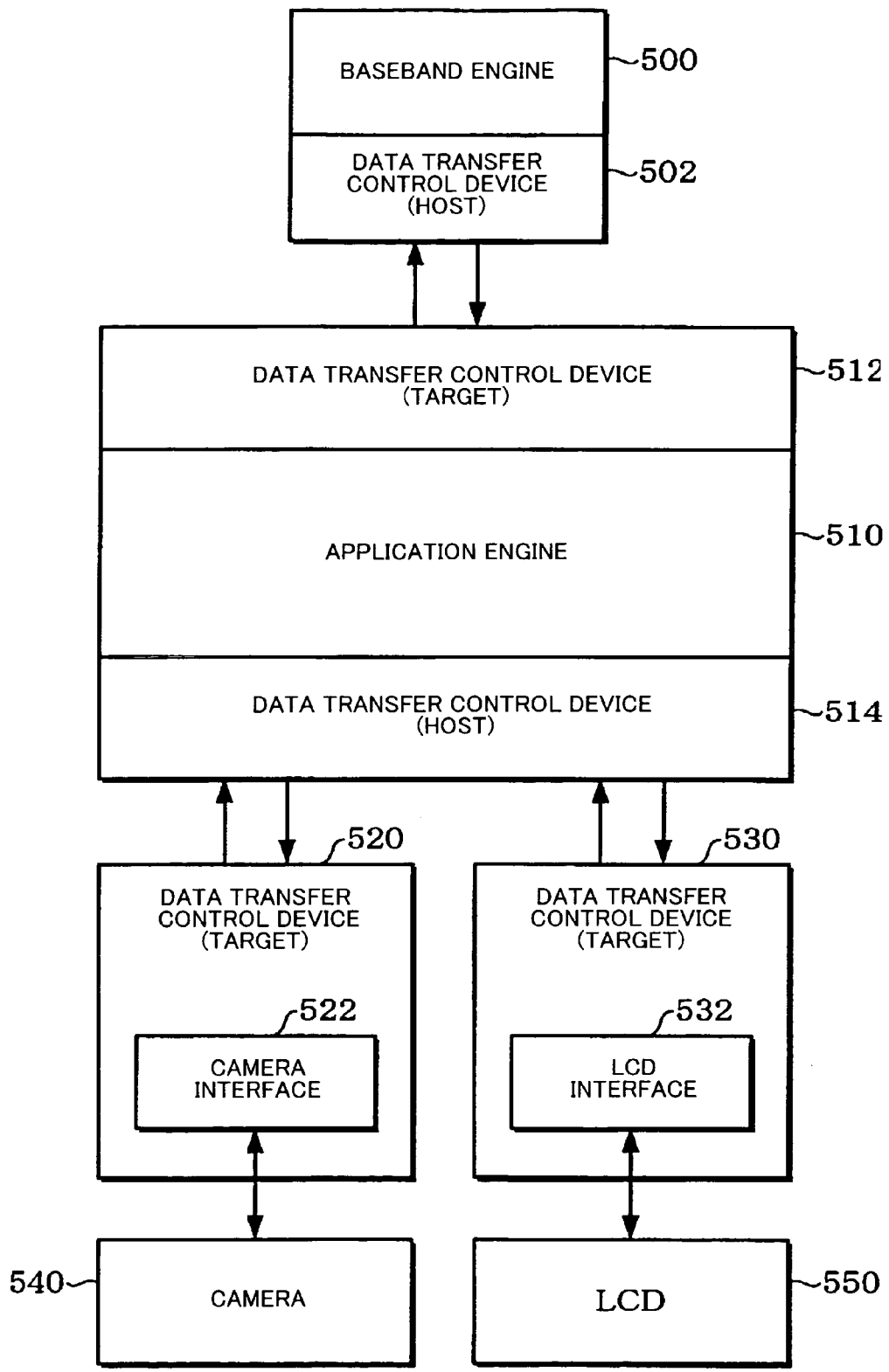
FIG. 14 is a configuration example of an electronic instrument.

FIG. 14 shows a configuration example of an electronic instrument in this embodiment. The electronic instrument includes data transfer control devices 502, 512, 514, 520, and 530 described in this embodiment. The electronic instrument includes a baseband engine 500 (communication device in a broad sense), an application engine 510 (processor in a broad sense), a camera 540 (imaging device in a broad sense), and an LCD 550 (display device in a broad sense). The electronic instrument may have a configuration in which some of these blocks are omitted. According to the configuration shown in FIG. 14, a portable telephone having a camera function and a display function of a liquid crystal display (LCD) can be realized. However, the electronic instrument in this embodiment is not limited to the portable telephone, and may be applied to various electronic instruments such as a digital camera, PDA, electronic notebook, electronic dictionary, or portable information terminal.

As shown in FIG. 14, the serial transfer described in this embodiment is performed between the host-side data transfer control device 502 provided to the baseband engine 500 and the target-side data transfer control device 512 provided to the application engine 510 (graphic engine). The serial transfer described in this embodiment is also performed between the host-side data transfer control device 514 provided to the application engine 510 and the data transfer control device 520 including a camera interface circuit 522 or the data transfer control device 530 including an LCD interface circuit 532.

According to the configuration shown in FIG. 14, EMI noise can be reduced in comparison with a conventional electronic instrument which transfers data through a parallel bus. Moreover, power consumption of the electronic instrument can be further reduced by realizing a reduction of the scale and power consumption of the data transfer control device. In the case where the electronic instrument is a portable telephone, a serial signal line can be used as a signal line which passes through a hinge section of the portable telephone, whereby mounting can be facilitated.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention. For example, any term cited with a different term (partner device, stream interface, command/data interface, communication device, processor, imaging device, display device, and the like) having broader or the same meaning at least once in this specification and drawings can be replaced by the different term (data transfer control device, RGB interface, MPU interface, baseband engine, application engine, camera, LCD, and the like) in any place in this specification and drawings.

The configuration of the data transfer control device in this embodiment is not limited to the configurations described with reference to FIG. 1 and FIGS. 7 to 10. Various modifications and variations are possible.

What is claimed is:

1. A data transfer control device for performing serial transfer through a serial bus, the data transfer control device comprising:

a transceiver which receives a request packet from a partner device connected with the serial bus; and a link controller which analyzes the request packet that is received, the request packet including an address size field for informing a size value of an address set in an address field of the request packet, and the link controller reading an address size value set in the address size field of the request packet, omitting reading of an address from the address field when the address size value set in the address size field is zero, and reading an address of which size is indicated by the address size value from the address field when the address size value set in the address size field is other than zero.

2. The data transfer control device as defined in claim 1, comprising:

an interface circuit for performing data transfer through a bus differing from the serial bus, when the address size value set in the address size field is zero, the link controller accessing a first device through the interface circuit and performing stream transfer of data.

3. The data transfer control device as defined in claim 2, the first device being a display device, and the data subjected to the stream transfer being display data.

4. An electronic instrument, comprising:

the data transfer control device as defined in claim 3; and at least one of a communication device, a processor, an imaging device, and a display device, wherein at least one of the communication device, the processor, the imaging device and the display device is connected to the data transfer control device or the partner device.

5. The data transfer control device as defined in claim 2, when the address size value set in the address size field is other than zero, the link controller reading an address of which size is indicated by the address size value from the address field and determining an access destination corresponding to the read address.

6. The data transfer control device as defined in claim 5, when the determined access destination is a second device, the link controller accessing the second device through the interface circuit and transferring data or a command.

7. The data transfer control device as defined in claim 5, when the determined access destination is an internal register of the data transfer control device, the link controller accessing the internal register.

8. An electronic instrument, comprising:
the data transfer control device as defined in claim 5; and
at least one of a communication device, a processor, an imaging device, and a display device, wherein
at least one of the communication device, the processor, the imaging device and the display device is connected to the data transfer control device or the partner device.

9. The data transfer control device as defined in claim 2, comprising:
a first interface circuit for performing stream data transfer with the first device through a first bus differing from the serial bus;
a second interface circuit for performing transfer of command or data with a second device through a second bus differing from the serial bus; and
a demultiplexer provided between the link controller and the first and second interface circuits,
when an address size value of zero is set in the address size field, the demultiplexer connecting the link controller with the first interface circuit.

10. The data transfer control device as defined in claim 9, when an address size value other than zero is set in the address size field and an access destination corresponding to an address set in the address field is the second device, the demultiplexer connecting the link controller with the second interface circuit.

11. An electronic instrument, comprising:
the data transfer control device as defined in claim 9; and
at least one of a communication device, a processor, an imaging device, and a display device, wherein
at least one of the communication device, the processor, the imaging device and the display device is connected to the data transfer control device or the partner device.

12. An electronic instrument, comprising:
the data transfer control device as defined in claim 2; and
at least one of a communication device, a processor, an imaging device, and a display device, wherein
at least one of the communication device, the processor, the imaging device and the display device is connected to the data transfer control device or the partner device.

13. The data transfer control device as defined in claim 1, comprising:
a first interface circuit for performing stream data transfer with a first device through a first bus differing from the serial bus;
a second interface circuit for performing transfer of command or data with a second device through a second bus differing from the serial bus; and
a demultiplexer provided between the link controller and the first and second interface circuits,
when an address size value of zero is set in the address size field, the demultiplexer connecting the link controller with the first interface circuit.

14. The data transfer control device as defined in claim 13, when an address size value other than zero is set in the address size field and an access destination corresponding to an address set in the address field is the second device, the demultiplexer connecting the link controller with the second interface circuit.

15. An electronic instrument, comprising:
the data transfer control device as defined in claim 13; and
at least one of a communication device, a processor, an imaging device, and a display device, wherein
at least one of the communication device, the processor, the imaging device and the display device is connected to the data transfer control device or the partner device.

16. An electronic instrument, comprising:
the data transfer control device as defined in claim 1; and
at least one of a communication device, a processor, an imaging device, and a display device, wherein
at least one of the communication device, the processor, the imaging device and the display device is connected to the data transfer control device or the partner device.

17. A data transfer control device for performing serial transfer through a serial bus, the data transfer control device comprising:
a link controller which generates a request packet to be transmitted to a partner device connected with the serial bus, and directs transmission of the request packet; and
a transceiver which transmits the request packet of which transmission has been directed to the partner device through the serial bus,
the request packet including an address size field for informing a size value of an address set in an address field of the request packet, and
when transmitting a first request packet which does not require an address to the partner device, the link controller generating the first request packet in which an address size value of zero is set in the address size field and the address field is omitted, and directing transmission of the first request packet, and, when transmitting a second request packet which requires an address to the partner device, the link controller generating the second request packet in which an address size value other than zero is set in the address size field and an address of which size is indicated by the address size value is set in the address field, and directing transmission of the second request packet.

18. The data transfer control device as defined in claim 17, the first request packet and the second request packet including a response request field for informing whether or not to perform handshake transfer using an acknowledge packet, and
the link controller setting a response request value indicating that response is not requested in the response request field when setting an address size value of zero in the address size field.

19. An electronic instrument, comprising:
the data transfer control device as defined in claim 18; and
at least one of a communication device, a processor, an imaging device, and a display device, wherein
at least one of the communication device, the processor, the imaging device and the display device is connected to the data transfer control device or the partner device.

20. An electronic instrument, comprising:
the data transfer control device as defined in claim 17; and
at least one of a communication device, a processor, an imaging device, and a display device, wherein
at least one of the communication device, the processor, the imaging device and the display device is connected to the data transfer control device or the partner device.

* * * * *